United States Patent
Sugaya et al.

(10) Patent No.: US 10,869,218 B2
(45) Date of Patent: Dec. 15, 2020

(54) INFORMATION PROCESSING DEVICES AND COMMUNICATION SYSTEM FOR CONTROLLING TRANSMISSION OF ACKNOWLEDGEMENT AND DATA

(71) Applicant: SONY CORPORATION, Tokyo (JP)

(72) Inventors: Shigeru Sugaya, Kanagawa (JP); Eisuke Sakai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/746,831

(22) PCT Filed: Jul. 21, 2016

(86) PCT No.: PCT/JP2016/071366
§ 371 (c)(1),
(2) Date: Jan. 23, 2018

(87) PCT Pub. No.: WO2017/043189
PCT Pub. Date: Mar. 16, 2017

(65) Prior Publication Data
US 2018/0213433 A1    Jul. 26, 2018

(30) Foreign Application Priority Data

Sep. 11, 2015    (JP) .................................. 2015-179085

(51) Int. Cl.
*H04W 28/04* (2009.01)
*H04W 28/02* (2009.01)
(Continued)

(52) U.S. Cl.
CPC ......... *H04W 28/0236* (2013.01); *H04L 1/165* (2013.01); *H04L 1/1614* (2013.01);
(Continued)

(58) Field of Classification Search
CPC ......... H04W 28/0236; H04W 28/0289; H04W 28/10; H04W 28/04; H04W 4/06;
(Continued)

(56) References Cited

U.S. PATENT DOCUMENTS 7,385,923 B2 * 6/2008 Baratakke ............... H04L 29/06
                                                    370/235
7,477,675 B2 * 1/2009 Endoh ...................... H04L 69/16
                                                    370/235

(Continued)

FOREIGN PATENT DOCUMENTS

| EP | 2 304 890 A1 | 4/2011 |
|---|---|---|
| JP | 2004-320481 A | 11/2004 |
| JP | 2010-10858 A | 1/2010 |

OTHER PUBLICATIONS

International Search Report dated Aug. 23, 2016 in PCT/JP2016/071366 filed Jul. 21, 2016.

(Continued)

*Primary Examiner* — Yemane Mesfin
*Assistant Examiner* — Intekhaab A Siddiquee
(74) *Attorney, Agent, or Firm* — Xsensus LLP

(57) ABSTRACT

An information processing device includes a control unit. The control unit performs control to restrict retransmission of data or transmission of a request for an acknowledgment of receipt of the retransmission data, in accordance with the congestion status of a wireless transmission traffic. The control unit also performs control to transfer acquired data to an upper layer in case of having successfully acquired the data up to a predetermined sequence number in multicast data transmitted from another device that restricts retransmission of data in accordance with the congestion status of a wireless transmission traffic. The device can prevent decreases in the total throughput in a network.

12 Claims, 17 Drawing Sheets

(51) Int. Cl.
    *H04W 28/10* (2009.01)
    *H04L 1/16* (2006.01)
    *H04L 1/18* (2006.01)
    *H04W 48/06* (2009.01)
    *H04W 4/06* (2009.01)
    *H04L 1/00* (2006.01)

(52) U.S. Cl.
    CPC .......... *H04L 1/1685* (2013.01); *H04L 1/1867* (2013.01); *H04W 4/06* (2013.01); *H04W 28/0289* (2013.01); *H04W 28/04* (2013.01); *H04W 28/10* (2013.01); *H04W 48/06* (2013.01); *H04L 1/1835* (2013.01); *H04L 1/1854* (2013.01); *H04L 1/1887* (2013.01); *H04L 2001/0093* (2013.01)

(58) Field of Classification Search
    CPC ........ H04W 48/06; H04L 1/16; H04L 1/1614; H04L 1/165; H04L 1/1835
    USPC ......................................................... 370/235
    See application file for complete search history.

(56) References Cited

U.S. PATENT DOCUMENTS

| | | | |
|---|---|---|---|
| 2002/0191594 A1* | 12/2002 | Itoh ...................... | H04L 1/0002 370/352 |
| 2005/0100048 A1 | 5/2005 | Chun et al. | |
| 2006/0092871 A1 | 5/2006 | Nishibayashi et al. | |
| 2010/0002646 A1 | 1/2010 | Nishibayashi et al. | |
| 2011/0064013 A1 | 3/2011 | Liu et al. | |
| 2012/0106427 A1 | 5/2012 | Nakae et al. | |
| 2012/0239998 A1* | 9/2012 | Park ...................... | H04L 1/1812 714/748 |
| 2013/0294244 A1 | 11/2013 | Fujita et al. | |

OTHER PUBLICATIONS

Extended European Search Report dated Mar. 20, 2019 in European Application No. 16844053.5-1219.

* cited by examiner

EXAMPLE CONFIGURATION OF A-MPDU FRAME

EXAMPLE CONFIGURATION OF FRAME IN CASE
WHERE MPDUs ARE SUCCESSIVELY TRANSMITTED

EXAMPLE CONFIGURATION OF BLOCK ACK REQUEST FRAME

EXAMPLE MULTICAST COMMUNICATION

EXAMPLE MULTICAST COMMUNICATION

EXAMPLE MULTICAST COMMUNICATION

EXAMPLE MULTICAST COMMUNICATION

INFORMATION PROCESSING DEVICES AND COMMUNICATION SYSTEM FOR CONTROLLING TRANSMISSION OF ACKNOWLEDGEMENT AND DATA

TECHNICAL FIELD

The present technology relates to information processing devices. More particularly, the present technology relates to information processing devices that receive and transmit data through wireless communication, a communication system, an information processing method, and a program for causing a computer to implement the method.

BACKGROUND ART

In recent years, small-scale wireless networks such as wireless local area networks (LANs) have become widespread. In such a wireless network, services through unicast communication are provided between an access point and a specific receiving device, for example. Further, because of diversification of services, services through multicast communication, in addition to the services through unicast communication, are provided from an access point to a large number of receiving devices.

According to an example method, in a case where multicast communication is performed, a transmitting device receives returns of ACKs from all the receiving devices, and confirms receipt of the multicast data. Specifically, the transmitting device transmits a block ACK request to receiving devices as necessary, and receives returns of block ACKs from the receiving devices. Then, in accordance with the received block ACKs, the transmitting device determines whether to retransmit the multicast data. Thus, services through multicast communication can be provided in a reliable manner.

Further, in a case where the same packet is transmitted to the same terminal station a plurality of times by multicast, for example, if the communication quality of the wireless communication with the terminal station is higher than a predetermined value, the number of times the same packet is to be transmitted is reduced in a wireless communication system suggested in a patent document (see Patent Document 1, for example).

CITATION LIST

Patent Document

Patent Document 1: Japanese Patent Application Laid-Open No. 2010-010858

SUMMARY OF THE INVENTION

Problems to be Solved by the Invention

In the above mentioned conventional technology, when the communication quality is higher than the predetermined value, a predetermined number of times retransmission is to be performed is reduced. Therefore, even packets that have already reached the receiving device might be repeatedly retransmitted the reduced number of times, and the total throughput in the network might decrease.

Also, in the above mentioned conventional technology, if the number of receiving devices in multicast communication is small, a check is made to determine whether retransmission of multicast data is possible in accordance with a block ACK, so that the services through multicast communication can be made to function in an effective manner.

However, in a case where there are a large number of receiving devices in multicast communication, when ACKs are returned from the large number of receiving devices, the transmission time required for returning the ACKs becomes longer, and there is a risk that the traffic of other communication will be compressed.

Therefore, in a case where there are a large number of receiving devices in multicast communication, receiving devices to which a block ACK request is to be sent may be selected from the large number of receiving devices. In this case, however, if the receiving devices to which a block ACK request is to be sent are not properly selected, the data that needs to be retransmitted cannot be identified, and appropriate multicast communication services might not be provided.

Further, if retransmission of multicast data is repeated only for some of the receiving devices in multicast communication, the large number of receiving devices that have already completed reception need to repeatedly perform unnecessary reception processes. This might reduce the total throughput in the network.

The present technology has been developed in view of those circumstances, and aims to prevent a decrease in the total throughput in a network.

Solutions to Problems

The present technology has been developed to solve the above problems, and a first aspect thereof is an information processing device that performs control to restrict retransmission of data or transmission of a request for an acknowledgment of receipt of the retransmission data in accordance with the congestion status of a wireless transmission traffic, an information processing method implemented in the information processing device, and a program for causing a computer to implement the method. This brings out the effect of restricting retransmission of data or transmission of a request for an acknowledgment of receipt of the retransmission data in accordance with the congestion status of the wireless transmission traffic.

In the first aspect, the control unit may also perform control to restrict retransmission of multicast data in accordance with the congestion status. This brings out the effect of restricting retransmission of multicast data in accordance with a congestion status.

In the first aspect, in a case where retransmission of the data is performed, the control unit may also transmit a request for an acknowledgment of receipt of the retransmission data. This brings out the effect of transmitting a request for an acknowledgment of receipt of the retransmission data in a case where transmission of the data is performed.

Further, in the first aspect, in a case where the congestion status satisfies a predetermined condition, the control unit may perform retransmission of the data, but may not transmit a request for an acknowledgment of receipt of the retransmission data and perform further retransmission after the retransmission. This brings out the effect of performing retransmission of data but not transmitting a request for an acknowledgment of receipt of the retransmission data and not performing further retransmission after the retransmission, in a case where the congestion status satisfies a predetermined condition.

Also, in the first aspect, the control unit may determine the congestion status in accordance with the wireless transmission traffic during a predetermined period. This brings out the effect of determining the congestion status in accordance with the wireless transmission traffic during a predetermined period.

Further, in the first aspect, the control unit may determine the congestion status, in accordance with the times of usage of the wireless transmission traffic by the information processing device and another device, the retransmission time of the data, the transmission time of the receipt acknowledgment request, and the reception time of a receipt acknowledgment in response to the receipt acknowledgment request, during a predetermined period. This brings out the effect of determining the congestion status of the wireless transmission traffic, in accordance with the times of usage of the wireless transmission traffic by the information processing device and another device, the retransmission time of the data, the transmission time of the receipt acknowledgment request, and the reception time of a receipt acknowledgment in response to the receipt acknowledgment request, during a predetermined period.

Also, in the first aspect, the control unit may determine whether to restrict retransmission of the data or transmission of a request for an acknowledgment of receipt of the retransmission data, in accordance with a result of comparison between a threshold value and a value calculated in accordance with the times of usage of the wireless transmission traffic by the information processing device and another device, the retransmission time of the data, the transmission time of the receipt acknowledgment request, and the reception time of a receipt acknowledgment in response to the receipt acknowledgment request, during a predetermined period. This brings out the effect of determining whether to restrict retransmission of the data or transmission of a request for an acknowledgment of receipt of the retransmission data, in accordance with a result of comparison between a threshold value and a value calculated in accordance with the times of usage of the wireless transmission traffic by the information processing device and another device, the retransmission time of the data, the transmission time of the receipt acknowledgment request, and the reception time of a receipt acknowledgment in response to the receipt acknowledgment request, during a predetermined period.

Further, in the first aspect, the control unit may determine to perform retransmission of the data and transmission of a request for an acknowledgment of receipt of the retransmission data in accordance with a result of comparison between the calculated value and a first threshold value, and determines to perform retransmission of the data and not to transmit a request for an acknowledgment of receipt of the retransmission data, or not to perform retransmission of the data and transmission of a request for an acknowledgment of receipt of the retransmission data, in accordance with a result of comparison between the calculated value and a second threshold value, the second threshold value being a more relaxed value than the first threshold value. This brings out the effect of determining to perform retransmission of the data and transmission of a request for an acknowledgment of receipt of the retransmission data in accordance with a result of comparison between the calculated value and a first threshold value, and determines to perform retransmission of the data and not to transmit a request for an acknowledgment of receipt of the retransmission data, or not to perform retransmission of the data and transmission of a request for an acknowledgment of receipt of the retransmission data, in accordance with a result of comparison between the calculated value and a second threshold value.

Meanwhile, a second aspect of the present technology is an information processing device including a control unit that performs control to transfer acquired data to an upper layer in case of having successfully acquired the data up to a predetermined sequence number in multicast data transmitted from another device that restricts retransmission of data in accordance with the congestion status of a wireless transmission traffic, an information processing method implemented in the information processing device, and a program for causing a computer to implement the information processing method. This brings out the effect of transferring acquired data to an upper layer in case of successfully acquired the data up to a predetermined sequence number in multicast data transmitted from another device.

Also, in the second aspect, the control unit may determine that retransmission of the multicast data is not to be performed in case of detecting that a request for an acknowledgment of receipt of the multicast data is not to be transmitted from another device. This brings out the effect of determining that retransmission of the multicast data is not to be performed in case of detecting that a request for an acknowledgment of receipt of the multicast data is not to be transmitted from another device.

Further, in the second aspect, in case of determining that retransmission of the multicast data is not to be performed, the control unit may perform control to transfer data acquired before the determination to the upper layer even in case of having failed to acquire the data up to the predetermined sequence number. This brings out the effect of transferring the data acquired before determination to the upper layer even in a case where the data up to the predetermined sequence number cannot be acquired, in a case where it has been determined that retransmission of the multicast data is not to be performed.

Further, a third aspect of the present technology is a communication system including: a first information processing device that transmits a receipt acknowledgment in response to a request for an acknowledgment of receipt of data, in case of having received the request; and a second information processing device that restricts retransmission of the data or transmission of a request for an acknowledgment of receipt of the retransmission data, in accordance with the congestion status of a wireless transmission traffic, an information processing method implemented in the communication system, and a program for causing a computer to implement the information processing method. By virtue of the effects of the aspect, in case of receiving a request for an acknowledgment of receipt of data, the first information processing device transmits an acknowledgment of receipt in response to the receipt acknowledgment request. The second information processing device restricts retransmission of the data or transmission of a request for an acknowledgment of receipt of the retransmission data, in accordance with the congestion status of the wireless transmission traffic.

Effects of the Invention

According to the present technology, it is possible to achieve a great effect of preventing a decrease in the total throughput in a network. It should be noted that the effect of the present technology is not necessarily limited to that described herein, and may be any effect described in the present disclosure.

MODE FOR CARRYING OUT THE INVENTION

The following is a description of a mode for carrying out the present technology (the mode will be hereinafter referred to as the embodiment). Explanation will be made in the following order.

1. Embodiment (an example in which retransmission of data or transmission of a request for an acknowledgment of receipt of the retransmission data is restricted in accordance with the congestion status of the wireless transmission traffic)

2. Example Applications

1. Embodiment

Example System Configuration of a Communication System

Figure 1:
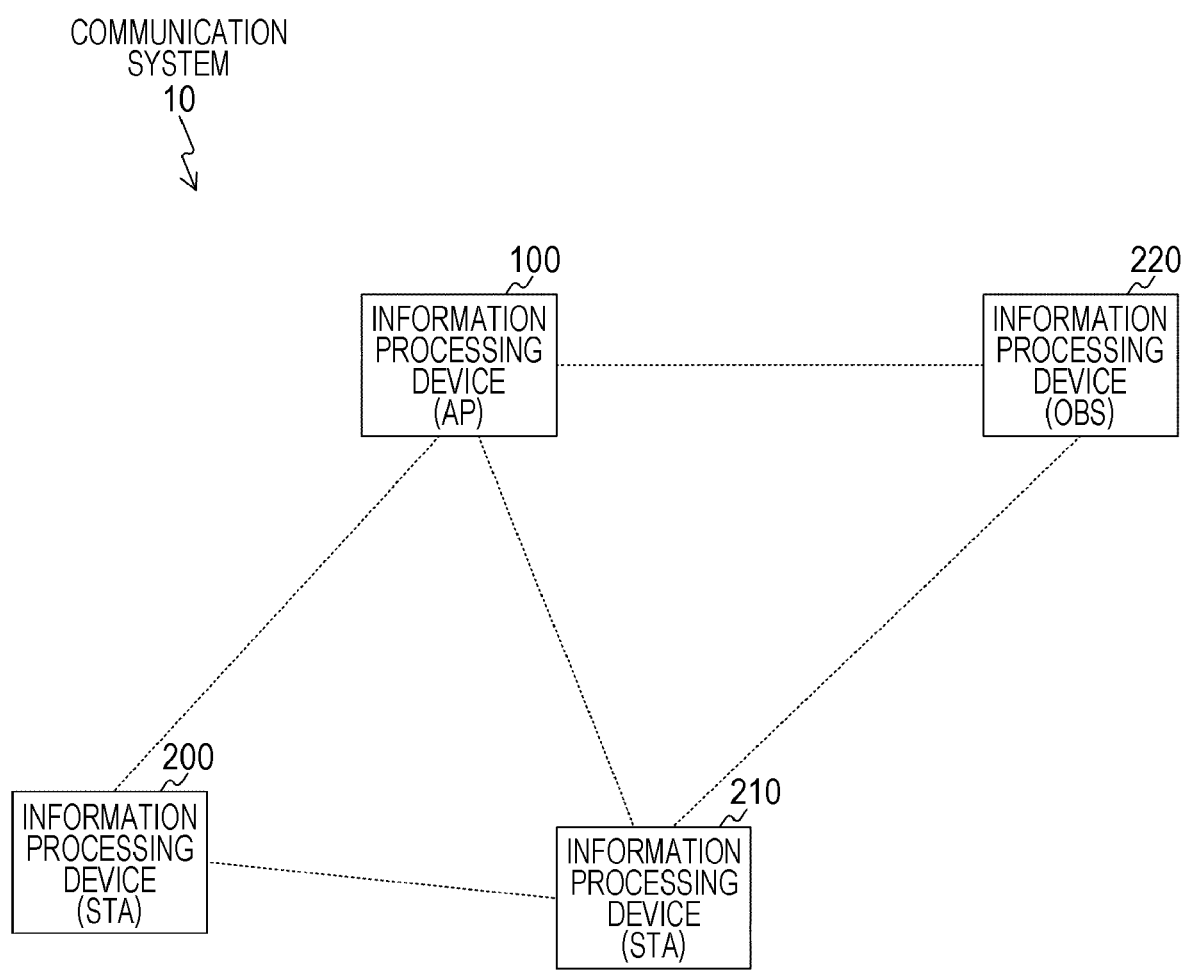
FIG. 1 is a diagram showing an example system configuration of a communication system 10 in an embodiment of the present technology.

FIG. 1 is a diagram showing an example system configuration of a communication system 10 in an embodiment of the present technology.

The communication system 10 is a wireless network including an information processing device (AP) 100, an information processing device (STA) 200, an information processing device (STA) 210, and an information processing device (OBS) 220. It should be noted that the information processing device (AP) 100 is an example of the second information processing device of the claims. Further, the information processing devices (STAs) 200 and 210 are an example of the first information processing device of the claims.

For example, the information processing device (AP) 100, the information processing devices (STAs) 200 and 210, and the information processing device (OBS) 220 may be stationary or portable devices (information processing devices, wireless communication devices, or electronic apparatuses, for example) having wireless communication functions. Here, stationary devices are devices such as access points, base stations, and the like in a wireless local area network (LAN) system, for example. Meanwhile, portable devices are devices such as smartphones, mobile phones, or tablet terminals, for example.

The information processing device (AP) 100, the information processing devices (STAs) 200 and 210, and the information processing device (OBS) 220 also have communication functions compliant with the wireless LAN standards of the Institute of Electrical and Electronic Engineers (IEEE) 802.11, for example. For example, the devices can have communication functions compliant with the wireless LAN standards of IEEE 802.11ax. Further, as a wireless LAN, Wireless Fidelity (Wi-Fi), Wi-Fi Direct, or Wi-Fi CERTIFIED Miracast specification (technical specification title: Wi-Fi Display) can be used, for example. Alternatively, wireless communication using some other communication method may be conducted.

For example, the communication system 10 may be a network (a mesh network or an ad-hoc network, for example) in which a plurality of devices are connected to one another by performing wireless communication on a one-to-one basis. For example, the communication system 10 can be used in a mesh network compliant with IEEE 802.11s.

The communication system 10 may also be a wireless network formed with an access point (a master station) and its subordinate devices (slave stations), for example. For example, the information processing device (AP) 100 may be an access point, and the information processing devices (STAs) 200 and 210 may be the subordinate devices.

FIG. 1 shows an example in which two subordinate devices (the information processing device (STA) 200 and the information processing device (STA) 210) exist near the information processing device (AP) 100. FIG. 1 also shows an example in which the information processing device (OBS) 220 belonging to a neighboring wireless network exists near the information processing device (AP) 100. That is, the information processing device (OBS) 220 is a device that belongs to a different wireless network from the wireless network to which the information processing device (AP) 100 and the information processing devices (STAs) 200 and 210 belong.

In FIG. 1, the information processing device (AP) 100 is in such a positional relationship as to be able to communicate with the information processing device (STA) 200, the information processing device (STA) 210, and the information processing device (OBS) 220. Meanwhile, the information processing device (STA) 200 can communicate only with the information processing device (AP) 100, and the information processing device (STA) 210 is in such a positional relationship as to be able to communicate with the information processing device (AP) 100 and the information processing device (OBS) 220. It should be noted that, in FIG. 1, each two devices that can communicate directly with each other through wireless communication are connected by a dotted line.

It should be noted that, in the embodiment of the present technology, the operations of the transmission source device (transmission-side device) and the transmission destination device (reception-side device) are described separately from each other, for the sake of convenience. However, both functions of each device may be installed, or only one of the functions may be installed.

Further, system configurations to which the embodiment of the present technology can be applied are not limited to the above. For example, FIG. 1 shows an example of a communication system formed with four devices. However, the number of devices is not necessarily four. Also, connection modes among the plurality of devices are not limited to the connection modes described above. For example, the embodiment of the present technology can also be applied to a network in which a plurality of devices are connected in a connection mode other than the connection modes described above.

The embodiment of the present technology is also an example case where the information processing device (AP) 100 conducts multicast communication with the information processing device (STA) 200 and the information processing device (STA) 210.

Example Configuration of an Information Processing Device

Figure 2:
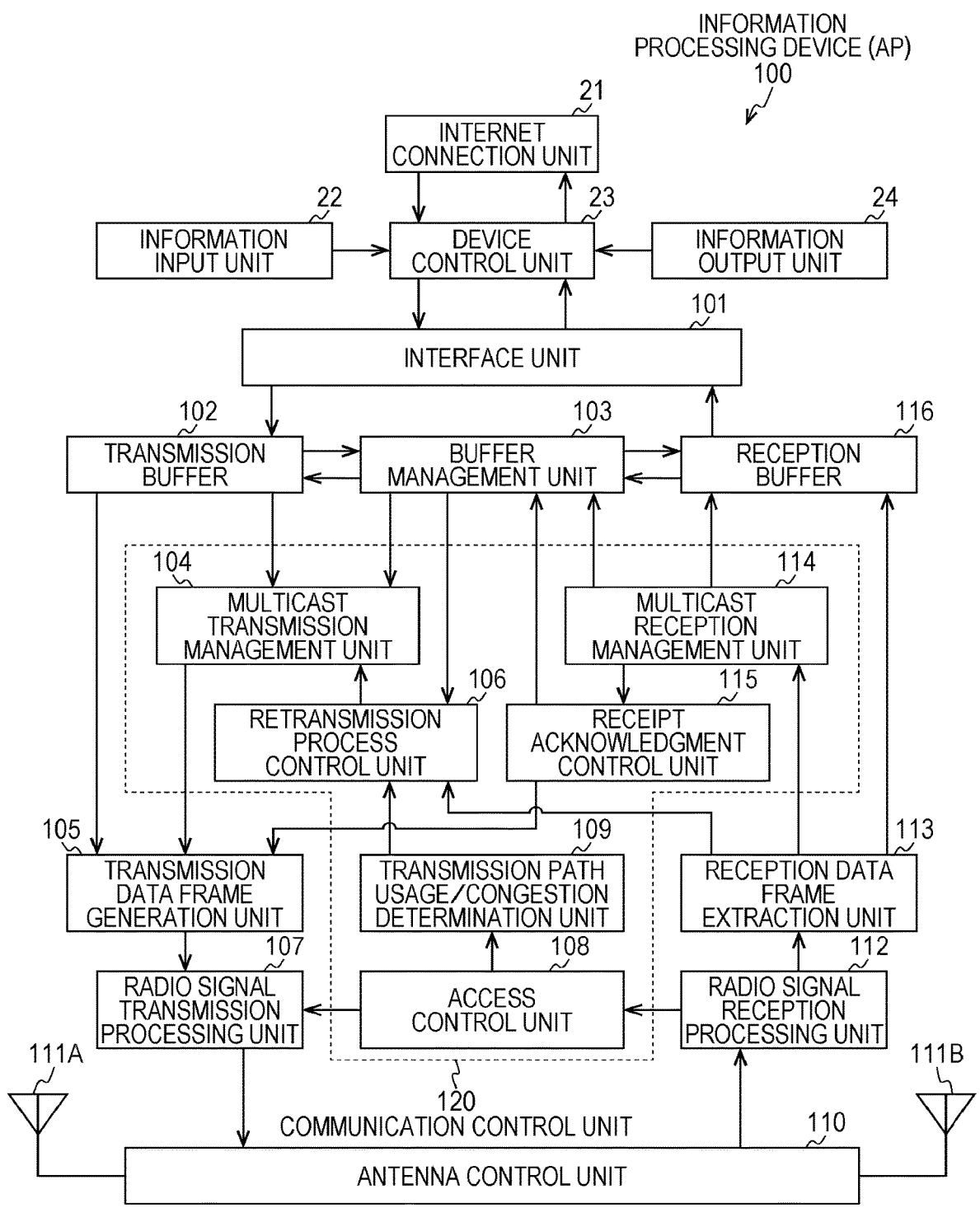
FIG. 2 is a block diagram showing an example functional configuration of an information processing device (AP) 100 in the embodiment of the present technology.

FIG. 2 is a block diagram showing an example functional configuration of the information processing device (AP) 100 in the embodiment of the present technology.

FIG. 2 shows only an example functional configuration of the information processing device (AP) 100, for the sake of convenience. However, the functional configurations (the functional configurations related to wireless communication) of the other information processing devices (the information processing devices (STAs) 200 and 210, and the information processing device (OBS) 220) are similar to that of the information processing device (AP) 100. It should be noted that the configurations of the devices may partially differ from one another. For example, in the case of an access point (AP), an Internet connection unit 21 may be connected to the Internet via a wired network.

The information processing device (AP) 100 includes the internet connection unit 21, an information input unit 22, a device control unit 23, and an information output unit 24. These components constitute an example system configuration in the information processing device (AP) 100, and may be provided as necessary.

The Internet connection unit 21 is a connection unit for connecting to the Internet.

The information input unit 22 is an information input unit that receives an information input (a keyboard input, for example) from the user.

The information output unit 24 is an information output unit that outputs information (an indication on a display, for example) to the user.

The device control unit 23 controls the entire system in the information processing device (AP) 100.

The information processing device (AP) 100 also includes an interface unit 101, a transmission buffer 102, a buffer management unit 103, a transmission data frame generation unit 105, a radio signal transmission processing unit 107, an antenna control unit 110, antenna elements 111A and 111B, a wireless signal reception processing unit 112, a reception data frame extraction unit 113, and a reception buffer 116. These components are formed by a wireless communication module specialized for wireless communication, for example.

Further, a communication control unit 120 includes a multicast transmission management unit 104, a retransmission process control unit 106, an access control unit 108, a transmission path usage/congestion determination unit 109, a multicast reception management unit 114, a receipt acknowledgment control unit 115. It should be noted that the communication control unit 120 is an example of the communication unit of the claims.

The interface unit 101 is an interface for receiving application data to be wirelessly transmitted in response to an input of information from the user, and outputting the wirelessly received application data as information to the user.

The transmission buffer 102 is a transmission buffer that temporarily stores data to be transmitted from the information processing device (AP) 100 to another information processing device.

The buffer management unit 103 is a buffer management unit that manages the remaining amounts in the transmission/reception buffers (the transmission buffer 102 and the reception buffer 116), to grasp the total amount of data to be transmitted and received.

The multicast transmission management unit 104 is a multicast transmission management unit that manages the amount of generation of data to be sent by multicast transmission.

The transmission data frame generation unit 105 is a transmission data frame generation unit that generates transmission data in a predetermined wireless transmission data frame format.

The retransmission process control unit 106 is a retransmission processing control unit that determines whether a retransmission process should be continued, in accordance with the state of traffic (a wireless transmission path). It should be noted that, in the embodiment of the present technology, traffic means a data amount, a communication path, and the like.

The radio signal transmission processing unit 107 is a radio signal transmission processing unit that converts a data frame to be transmitted into a radio-frequency signal as a baseband signal.

The access control unit 108 is an access control unit that controls traffic communication access in compliance with a predetermined wireless communication protocol.

The transmission path usage/congestion determination unit 109 is a transmission path usage/congestion determination unit that determines the congestion degree of the traffic (the radio transmission path) in terms of retransmission control.

The antenna control unit 110 is an antenna control unit that controls the antennas that transmit signals to the traffic and receives signals from the traffic.

The antenna elements 111A and 111B are antenna elements for transmitting or receiving signals to serve as a plurality of antenna elements.

The wireless signal reception processing unit 112 is a wireless signal reception processing unit for extracting a baseband signal from a radio-frequency signal received via an antenna.

The reception data frame extraction unit 113 is a reception data frame extraction unit that extracts data as a predetermined data frame from the baseband signal.

The multicast reception management unit 114 is a multicast reception management unit that manages the sequence numbers and the like of received multicast data addressed to its own device.

The receipt acknowledgment control unit 115 is a receipt acknowledgment control unit that recognizes the sequence number of the received data and carries out receipt acknowledgment (ACK) in response to a request from the data transmission source.

The reception buffer 116 is a reception buffer that temporarily stores the received data and the like until data of a predetermined unit is collected.

Example Frame Configuration of an Aggregation MAC Protocol Data Unit (A-MPDU)

Figure 3:
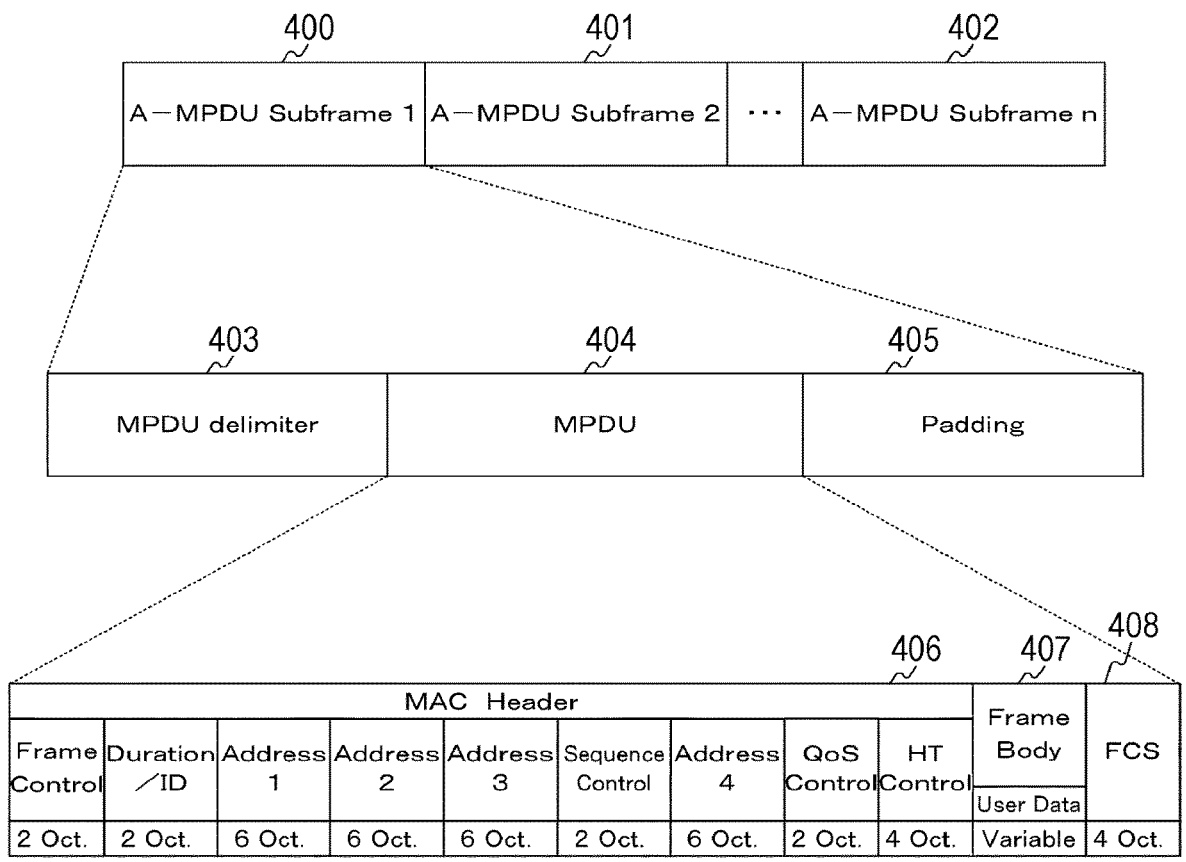
FIG. 3 is a diagram showing an example configuration of the frame format of an A-MPDU to be exchanged between devices in the embodiment of the present technology.

FIG. 3 is a diagram showing an example configuration of the frame format of an A-MPDU to be exchanged between devices in the embodiment of the present technology.

The A-MPDU is formed with a plurality of A-MPDU Subframes 1 (400) through n (402). Further, the A-MPDU Subframe 1 (400) is formed with an MPDU Delimiter (MPDU delimiter) 403, an MPDU 404, and a Padding (padding) 405.

As described above, in the A-MPDU, a plurality of MPDUs (including the MPDU 404) are transmitted together with the MPDU Delimiter and the Padding as a burst of a physical layer convergence protocol (PLCP).

That is, the A-MPDU is an aggregate of individual MPDUs. Meanwhile, the MPDU 404 includes a media access control (MAC) header 406, a frame body 407 in which actual data is stored, and a frame check sequence (FCS) 408.

Each device can determine whether the current multicast data is multicast data to be received by itself, in accordance with the information or the like written in the MAC header 406.

Figure 4:
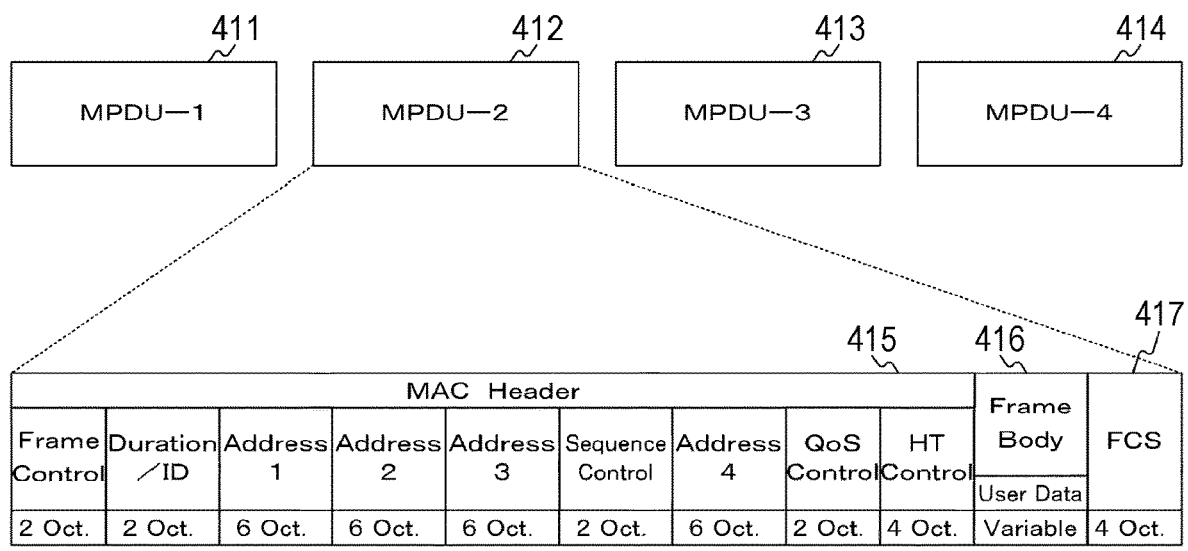
FIG. 4 is a diagram showing an example configuration of the frame format of a frame (a frame in a case where a plurality of MPDUs are successively transmitted) to be exchanged between devices in the embodiment of the present technology.

Example Frame Configuration in a Case Where a Plurality of MPDUs Are Successively Transmitted FIG. 4 is a diagram showing an example configuration of the frame format of a frame (a frame in a case where a plurality of MPDUs are successively transmitted) to be exchanged between devices in the embodiment of the present technology.

FIG. 4 shows an example case where multicast data is divided into a plurality of PLCP bursts, instead of one PLCP burst as in the A-MPDU shown in FIG. 3.

Specifically, FIG. 4 shows an example in which multicast data is formed with four MPDUs, MPDU-1 (411) through MPDU-4 (414). To these four sets of data (MPDU-1 (411) through MPDU-4 (414)), a block ACK can be returned by one block ACK request.

Further, among the four MPDUs (MPDU-1 (411) through MPDU-4 (414)), transmission may be performed at predetermined intervals (short-inter-frame spaces (SIFS), for example), and other data may be disposed and transmitted during the intervals.

Example Frame Configuration of a Block ACK Request

Figure 5:
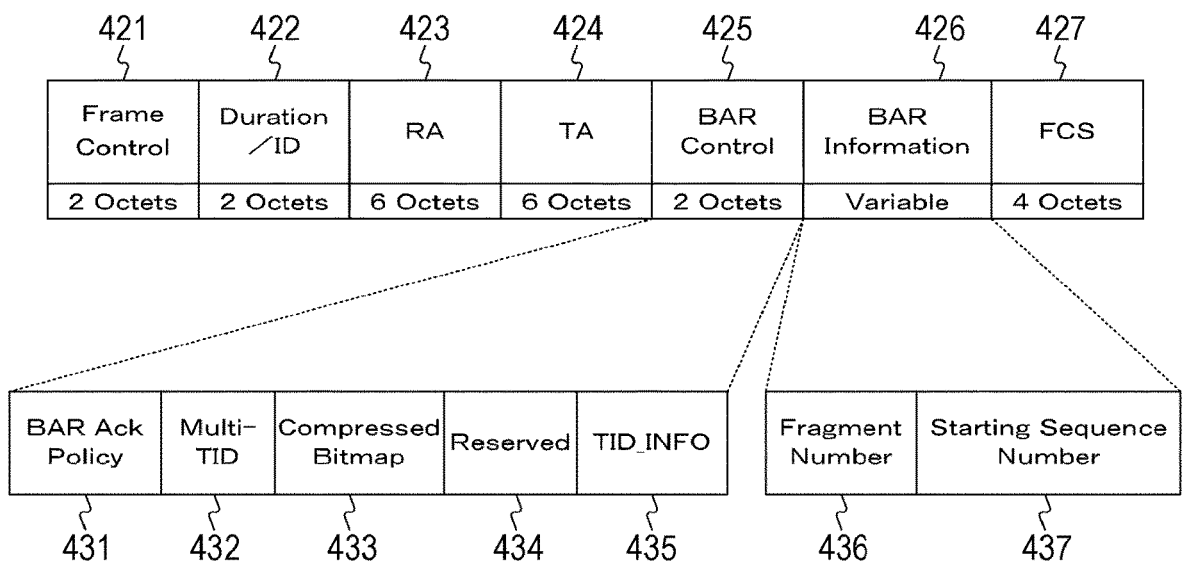
FIG. 5 is a diagram showing an example configuration of the frame format of a block ACK request to be exchanged between devices in the embodiment of the present technology.

FIG. 5 is a diagram showing an example configuration of the frame format of a block ACK request to be exchanged between devices in the embodiment of the present technology.

FIG. 5 shows a block ACK request frame configuration defined in IEEE 802.11-2012. Specifically, the MAC header is formed with the following elements: Frame Control (frame control) 421, a Duration/ID (duration time) 422, a Receiver Address (RA: receiver address) 423, and a Transmitter Address (TA: transmitter address) 424.

In addition, Block ACK Request (BAR) Control (block ACK request control) 425 and BAR Information (block ACK request information) 426 are added to the MAC header, and an FCS 427 is added at the end.

Specifically, information such as a policy (BAR ACK Policy 431) requesting a block ACK is written in the BAR Control 425. Further, information such as a start sequence number (Starting Sequence Number 437) for requesting a block ACK is described in the BAR information 426.

Example Configuration of a Block ACK Frame

Figure 6:
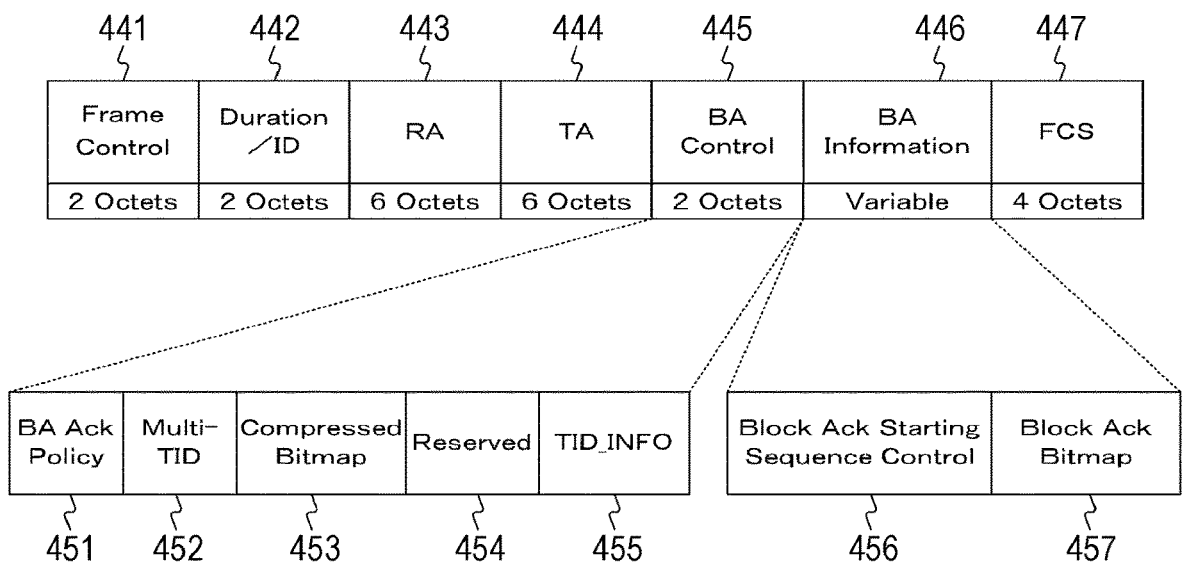
FIG. 6 is a diagram showing an example configuration of a block ACK frame to be exchanged between devices in the embodiment of the present technology.

FIG. 6 is a diagram showing an example configuration of a block ACK frame to be exchanged between devices in the embodiment of the present technology.

FIG. 6 shows a frame configuration defined in IEEE 802.11-2012. Specifically, the MAC header is formed with the following elements: Frame Control (frame control) 441, a Duration/ID (duration time) 442, a RA (receiver address) 443, and a TA (transmitter address) 444.

In addition, BA Control (block ACK control) 445 and BA Information (block ACK information) 446 are added to the MAC header, and an FCS 447 is added at the end.

Specifically, block ACK starting sequence control (Block ACK Starting Sequence Control 456) and a block ACK bitmap (Block ACK Bitmap 457) are written in the BA Information 446. It should be noted that, in the Block ACK Bitmap 457, the received sequence numbers are written in a bitmap format.

Example Setting of the Duration

In an example of the embodiment of the present technology, the information processing device (AP) 100 determines whether retransmission is possible in accordance with the remaining time in the Duration.

Here, the Duration is the value for determining the degree of congestion of the traffic, for example. The Duration may be either a fixed value or a variable value, for example. In a case where the Duration is a fixed value, a time of about one second can be set as the Duration, for example.

In a case where the Duration is a variable value, on the other hand, for example, the value of the Duration can be determined in accordance with the transmission data (size), the application type, the user setting, and the like.

Further, the Duration may be specified in terms of time, or may be specified on a frame basis. For example, the transmission interval between predetermined beacon signals can be set as the Duration.

Meanwhile, the start timing of the Duration can be set periodically or irregularly. In a case where the start timing of the Duration is set periodically, it is possible to set the start timing as every second, every minute, or the like.

Alternatively, the trigger of the start timing can be a target beacon transmission time (TBTT), for example. For example, the start timing of the Duration can be set in accordance with the TBTT.

The following is a description of an example in which a check is made to determine whether retransmission is possible, in accordance with the remaining time in the Duration, with reference to FIGS. 7 through 10. That is, FIGS. 7 through 10 show an example case where the information processing device (AP) 100 performs retransmission in accordance with the degree of congestion of the traffic (the wireless transmission path).

Examples of Communication

Referring now to FIGS. 7 through 10, examples of communication of data to be exchanged between a plurality of devices are described. FIGS. 7 through 10 show examples in which the information processing device (AP) 100 is the data transmission source, and the information processing devices (STAs) 200 and 210 are data transmission destinations. Further, in FIGS. 7 through 10, the abscissa axis indicates the time axis. Further, the data to be transmitted from the respective devices is represented by rectangles with the names of the data written therein, and is shown on the upper side or the lower side of the time axes corresponding to the respective devices. Further, in FIGS. 7 through 10, in a case where data is transmitted to a plurality of devices at the same time, multicast transmission of the data to the plurality of devices is performed.

Figure 7:
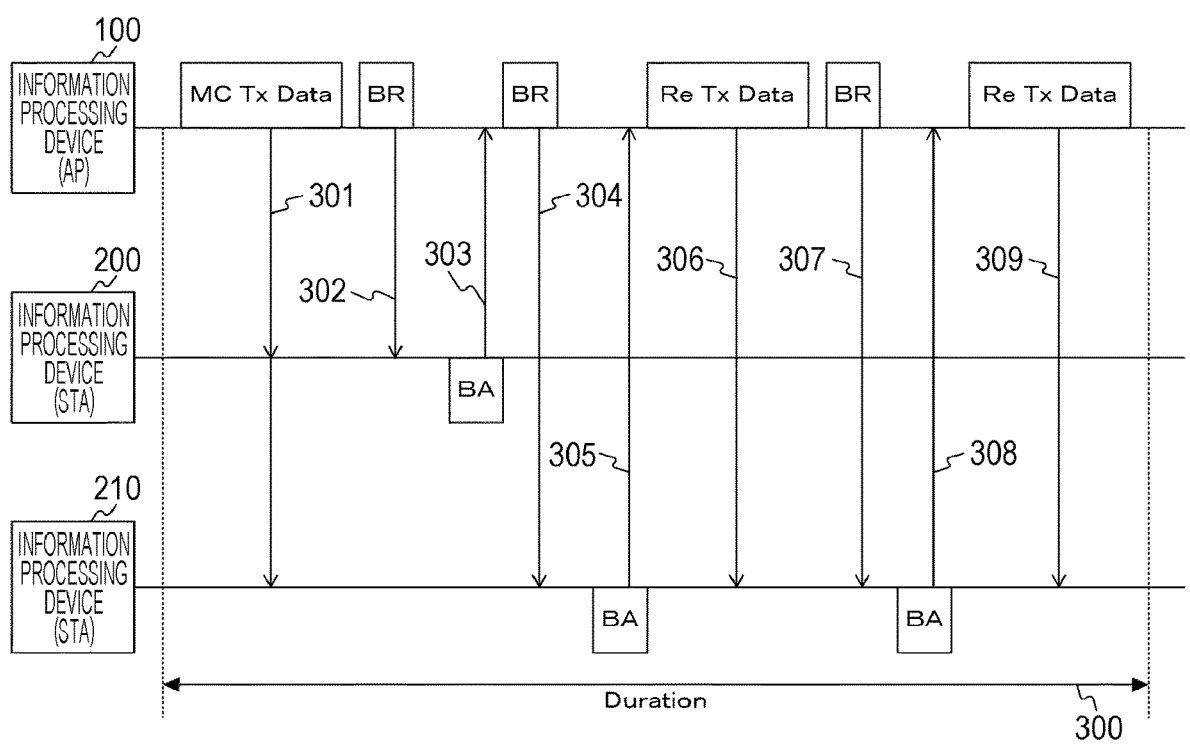
FIG. 7 is a diagram schematically showing a flow of data to be exchanged between devices in the embodiment of the present technology.

FIG. 7 is a diagram schematically showing a flow of data to be exchanged between devices in the embodiment of the present technology. FIG. 7 shows an example case where the information processing device (AP) 100 repeats retransmission twice.

First, the information processing device (AP) 100 transmits multicast data (MC Tx Data) to the information processing devices (STAs) 200 and 210 (301). After transmitting this multicast data, the information processing device (AP) 100 transmits a block ACK request (BR) to the information processing device (STA) 200 (302).

After receiving the block ACK request (BR), the information processing device (STA) 200 transmits a block ACK (BA) to the information processing device (AP) 100 (303).

The information processing device (AP) 100 then transmits a block ACK request (BR) to the information processing device (STA) 210 (304). After receiving the block ACK request (BR), the information processing device (STA) 210 transmits a block ACK (BA) to the information processing device (AP) 100 (305).

In this manner, the information processing device (AP) 100 sequentially transmits the block ACK request (BR) to the information processing devices (STAs) 200 and 210, to cause the information processing devices (STAs) 200 and 210 to return a block ACK (BA) of the multicast data (MC Tx Data). After that, the information processing device (AP) 100 can determine whether retransmission is necessary, in accordance with the received block ACK (BA).

FIG. 7 shows an example case where there is data yet to be delivered to the information processing device (STA) 210, after the transmission of the multicast data (MC Tx Data). In this case, the information processing device (AP) 100 needs to retransmit the multicast data to the information processing device (STA) 210.

Therefore, the information processing device (AP) 100 transmits first retransmission data (Re Tx Data) to the information processing device (STA) 210 (306). After transmitting the first retransmission data (Re Tx Data), the information processing device (AP) 100 transmits a block ACK request (BR) to the information processing device (STA) 210 (307). After receiving the block ACK request (BR), the information processing device (STA) 210 transmits a block ACK (BA) to the information processing device (AP) 100 (308).

After receiving the block ACK (BA), the information processing device (AP) 100 can determine whether retransmission is necessary, in accordance with the received block ACK (BA).

FIG. 7 shows an example case where there is data yet to be delivered to the information processing device (STA) 210, after the transmission of the first retransmission data (Re Tx Data). In this case, the information processing device (AP) 100 needs to retransmit the multicast data again to the information processing device (STA) 210.

Therefore, the information processing device (AP) 100 transmits second retransmission data (Re Tx Data) to the information processing device (STA) 210 (309).

At this stage, the information processing device (AP) 100 determines whether retransmission is possible, in accordance with the remaining time in the Duration 300 as a criterion of congestion degrees, for example. FIG. 7 shows an example in which the remaining time in the Duration 300 expires after the second retransmission data (Re Tx Data) is transmitted. Therefore, the information processing device (AP) 100 determines that a block ACK request (BR) is not to be transmitted.

As described above, in a case where the remaining time in the Duration 300 becomes shorter than a predetermined time, the information processing device (AP) 100 determines that the next retransmission is not to be performed. That is, in a case where the information processing device (AP) 100 determines that no further retransmission is to be performed, the information processing device (AP) 100 ends the series of processes, without transmitting a block ACK request.

Figure 8:
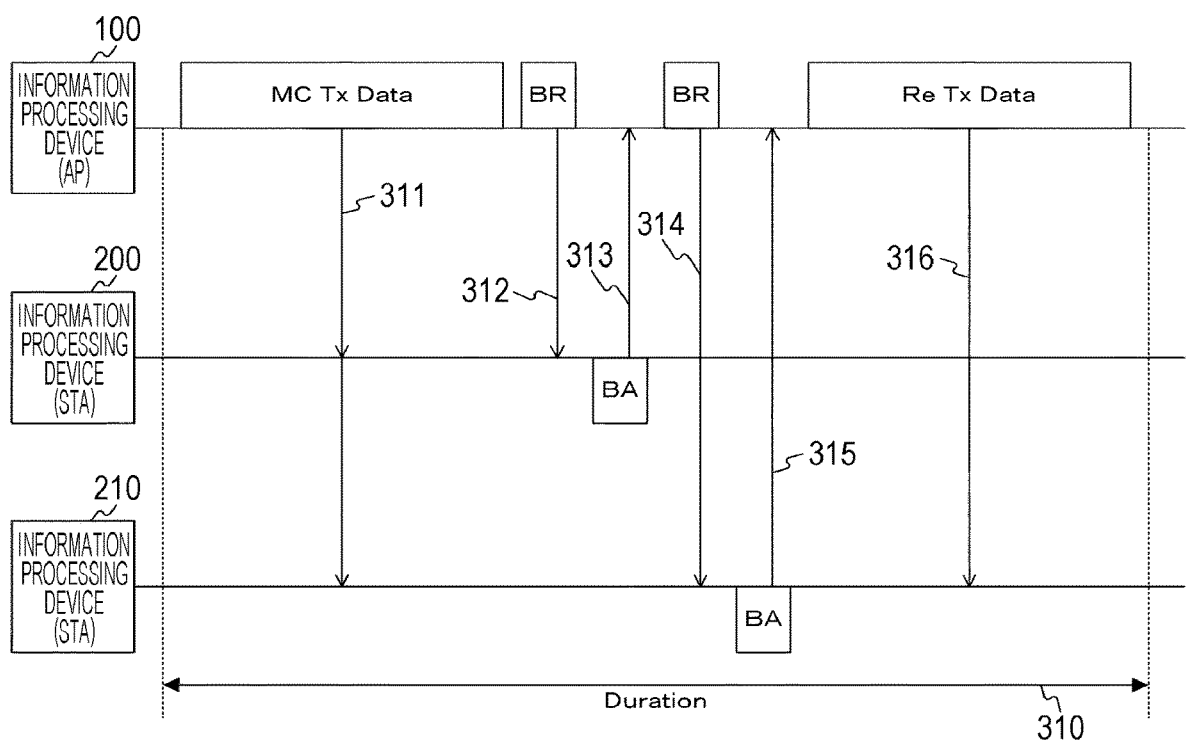
FIG. 8 is a diagram schematically showing a flow of data to be exchanged between devices in the embodiment of the present technology.

FIG. 8 is a diagram schematically showing a flow of data to be exchanged between devices in the embodiment of the present technology. FIG. 8 shows an example case where the information processing device (AP) 100 performs retransmission only once. FIG. 8 also shows an example case where the amount of multicast data to be transmitted is larger and the multicast data transmission time is longer than those in the example shown in FIG. 7.

First, the information processing device (AP) 100 transmits multicast data (MC Tx Data) to the information processing devices (STAs) 200 and 210 (311). After transmitting this multicast data, the information processing device (AP) 100 transmits a block ACK request (BR) to the information processing device (STA) 200 (312).

After receiving the block ACK request (BR), the information processing device (STA) 200 transmits a block ACK (BA) to the information processing device (AP) 100 (313).

The information processing device (AP) 100 then transmits a block ACK request (BR) to the information processing device (STA) 210 (314). After receiving the block ACK request (BR), the information processing device (STA) 210 transmits a block ACK (BA) to the information processing device (AP) 100 (315).

In this manner, the information processing device (AP) 100 sequentially transmits the block ACK request (BR) to the information processing devices (STAs) 200 and 210, to cause the information processing devices (STAs) 200 and 210 to return a block ACK (BA) of the multicast data (MC Tx Data). After that, the information processing device (AP) 100 can determine whether retransmission is necessary, in accordance with the received block ACK (BA).

FIG. 8 shows an example case where there is data yet to be delivered to the information processing device (STA) 210, after the transmission of the multicast data (MC Tx Data). In this case, the information processing device (AP) 100 needs to retransmit the multicast data to the information processing device (STA) 210.

Therefore, the information processing device (AP) 100 transmits first retransmission data (Re Tx Data) to the information processing device (STA) 210 (316).

At this stage, the information processing device (AP) 100 determines whether retransmission is possible, in accordance with the remaining time in the Duration 310. FIG. 8 shows an example in which the remaining time in the Duration 310 expires after the first retransmission data (Re Tx Data) is transmitted. Therefore, the information processing device (AP) 100 determines that a block ACK request (BR) is not to be transmitted.

As described above, in a case where the remaining time in the Duration 310 becomes shorter than a predetermined time, the information processing device (AP) 100 determines that the next retransmission is not to be performed. That is, in a case where the information processing device (AP) 100 determines that no further retransmission is to be performed, the information processing device (AP) 100 ends the series of processes, without transmitting a block ACK request.

Figure 9:
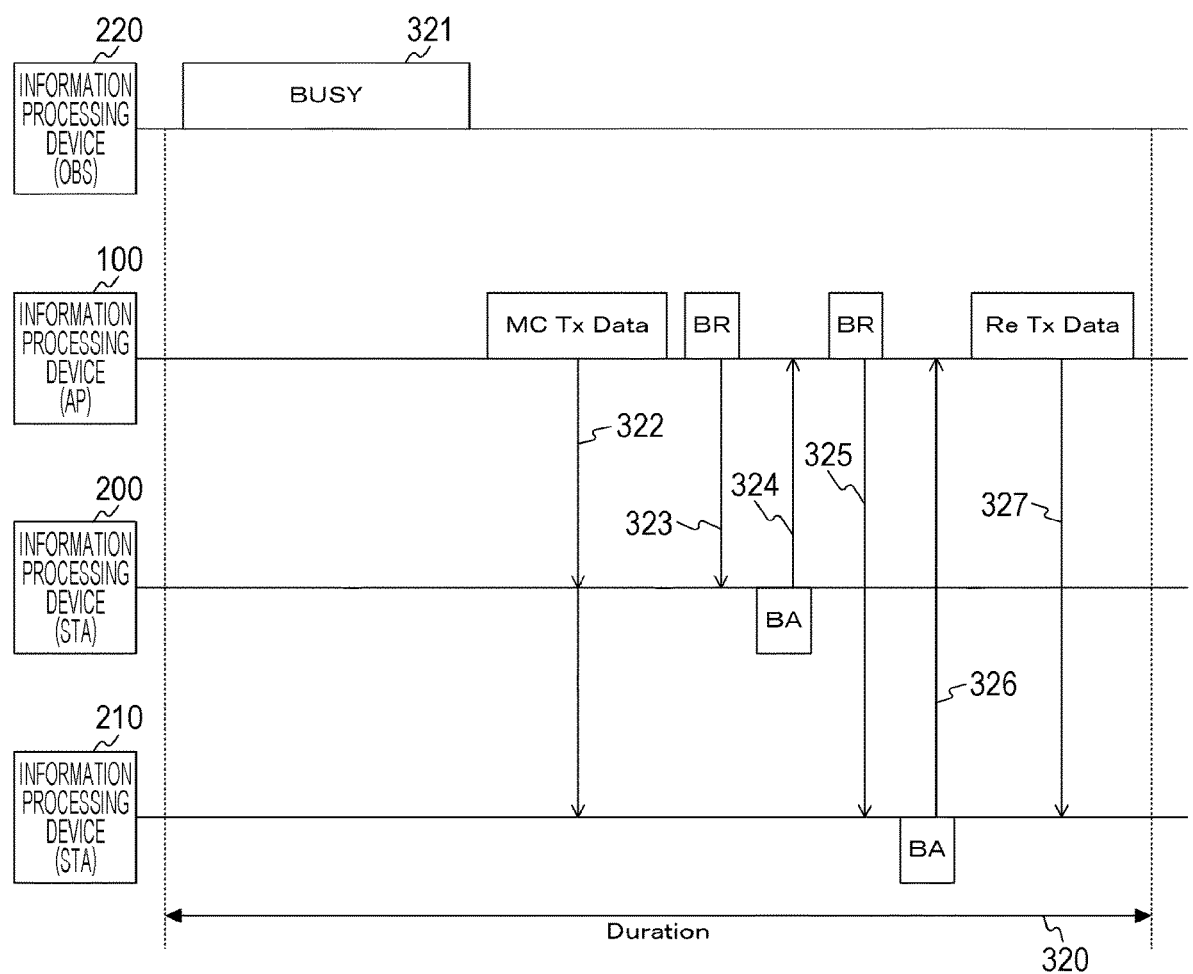
FIG. 9 is a diagram schematically showing a flow of data to be exchanged between devices in the embodiment of the present technology.

FIG. 9 is a diagram schematically showing a flow of data to be exchanged between devices in the embodiment of the present technology. FIG. 9 shows an example case where a relatively long time is required before transmission of multicast data, like a case where traffic (the wireless transmission path) is being used by other communication.

In the example case described below, the traffic has transmission from the information processing device (OBS) 220 before the information processing device (AP) 100 performs multicast communication, and therefore, the transmission path is already being used (BUSY 321). In this case, the traffic (the wireless transmission path) might be congested. Therefore, in the embodiment of the present technology, the multicast data is transmitted from the information processing device (AP) 100 following predetermined access control procedures, after the transmission from the information processing device (OBS) 220 is completed.

It should be noted that the end timing of the BUSY 321 can be recognized in accordance with the release timing of a network allocation vector (NAV), from the Duration/ID field value of the data transmitted from the information processing device (OBS) 220, for example.

After the end timing of the BUSY 321, the information processing device (AP) 100 transmits multicast data (MC Tx Data) to the information processing devices (STAs) 200 and 210, following the predetermined access control procedures (322). After transmitting this multicast data, the information processing device (AP) 100 transmits a block ACK request (BR) to the information processing device (STA) 200 (323).

After receiving the block ACK request (BR), the information processing device (STA) 200 transmits a block ACK (BA) to the information processing device (AP) 100 (324).

The information processing device (AP) 100 then transmits a block ACK request (BR) to the information processing device (STA) 210 (325). After receiving the block ACK request (BR), the information processing device (STA) 210 transmits a block ACK (BA) to the information processing device (AP) 100 (326).

In this manner, the information processing device (AP) 100 sequentially transmits the block ACK request (BR) to the information processing devices (STAs) 200 and 210, to cause the information processing devices (STAs) 200 and 210 to return a block ACK (BA) of the multicast data (MC Tx Data). After that, the information processing device (AP) 100 can determine whether retransmission is necessary, in accordance with the received block ACK (BA).

FIG. 9 shows an example case where there is data yet to be delivered to the information processing device (STA) 210, after the transmission of the multicast data (MC Tx Data). In this case, the information processing device (AP) 100 needs to retransmit the multicast data to the information processing device (STA) 210.

Therefore, the information processing device (AP) 100 transmits first retransmission data (Re Tx Data) to the information processing device (STA) 210 (327).

At this stage, the information processing device (AP) 100 determines whether retransmission is possible, in accordance with the remaining time in the Duration 320. FIG. 9 shows an example in which the remaining time in the Duration 320 expires after the first retransmission data (Re Tx Data) is transmitted. Therefore, the information processing device (AP) 100 determines that a block ACK request (BR) is not to be transmitted.

As described above, in a case where the remaining time in the Duration 320 becomes shorter than a predetermined time, the information processing device (AP) 100 determines that the next retransmission is not to be performed. That is, in a case where the information processing device (AP) 100 determines that no further retransmission is to be performed, the information processing device (AP) 100 ends the series of processes, without transmitting a block ACK request.

Figure 10:
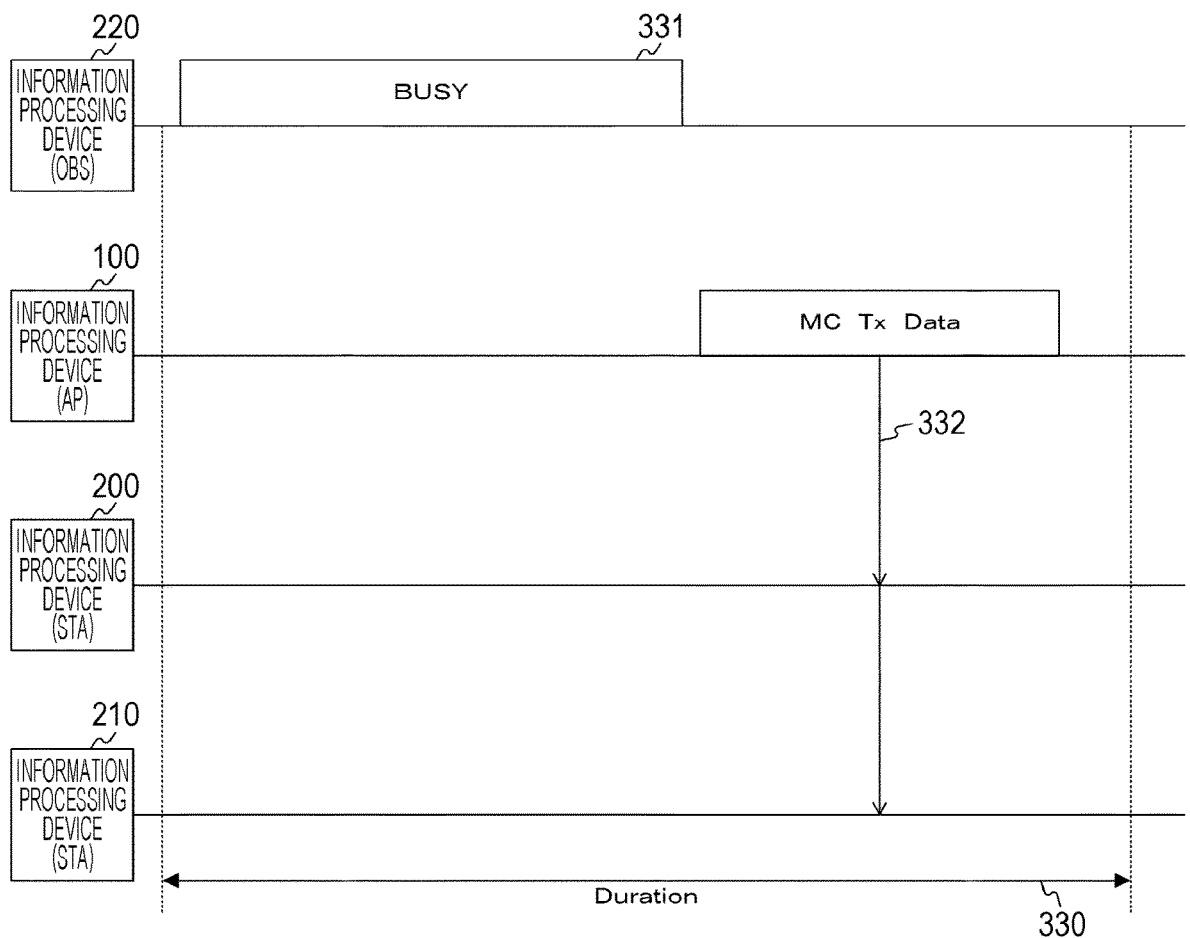
FIG. 10 is a diagram schematically showing a flow of data to be exchanged between devices in the embodiment of the present technology.

FIG. 10 is a diagram schematically showing a flow of data to be exchanged between devices in the embodiment of the present technology. FIG. 10 shows an example case where a relatively long time is required before transmission of multicast data, like a case where traffic (the wireless transmission path) is being used by other communication.

In the example case described below, the traffic has transmission from the information processing device (OBS) 220 before the information processing device (AP) 100 performs multicast communication, and therefore, the transmission path is already being used (BUSY 331). In this case, the traffic (the wireless transmission path) might be congested. Therefore, in the embodiment of the present technology, the multicast data is transmitted from the information processing device (AP) 100 following predetermined access control procedures, after the transmission from the information processing device (OBS) 220 is completed.

That is, the information processing device (AP) 100 transmits multicast data (MC Tx Data) to the information processing devices (STAs) 200 and 210 (332).

At this stage, the information processing device (AP) 100 determines that performing retransmission is not appropriate, in accordance with the congestion status of the traffic (the wireless transmission path). The information processing device (AP) 100 also determines whether retransmission is possible, in accordance with the remaining time in the Duration 330. FIG. 10 shows an example in which the remaining time in the Duration 330 expires after the multicast data (MC Tx Data) is transmitted. Therefore, the information processing device (AP) 100 determines that a block ACK request (BR) is not to be transmitted.

As described above, in a case where the information processing device (AP) 100 determines that performing retransmission is not appropriate in accordance with the congestion status of the traffic (the wireless transmission path), or where the remaining time in the Duration 330 becomes shorter than a predetermined time, the information processing device AP) 100 determines that the next retransmission is not to be performed. That is, in a case where the information processing device (AP) 100 determines that no further retransmission is to be performed, the information processing device (AP) 100 ends the series of processes, without transmitting a block ACK request.

As described above, in the example shown in FIG. 10, the information processing device (AP) 100 transmits the multicast data (MC Tx Data) to the information processing devices (STAs) 200 and 210, but does not perform retransmission. Therefore, the information processing device (AP) 100 does not transmit a block ACK request.

It should be noted that the examples shown in FIGS. 7 through 10 are example cases where the information processing device (AP) 100 performs control to restrict retransmission of data or transmission of a request (a block ACK request (BR), for example) for acknowledgment of receipt of retransmission data, in accordance with the congestion status of the wireless transmission traffic.

Example Operation of an Access Point (AP)
(Example of Multicast Transmission)

Figure 11:
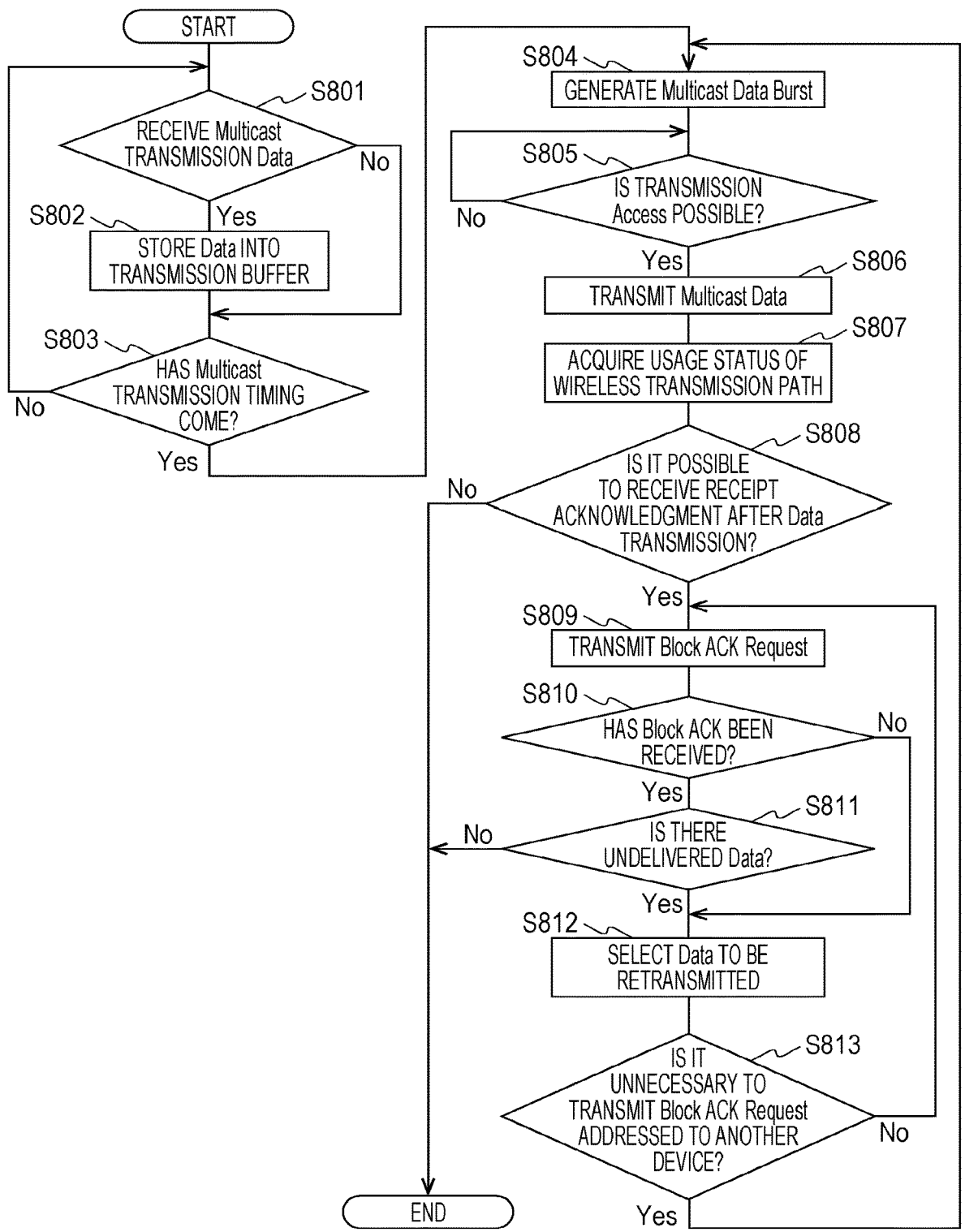
FIG. 11 is a flowchart showing an example of the processing procedures in a multicast transmission process to be performed by the information processing device (AP) 100 in the embodiment of the present technology.

FIG. 11 is a flowchart showing an example of the processing procedures in a multicast transmission process to be performed by the information processing device (AP) 100 in the embodiment of the present technology.

First, the communication control unit 120 of the information processing device (AP) 100 determines, via the interface unit 101, whether the multicast data to be transmitted has been received (step S801). If the multicast data has been received (step S801), the communication control unit 120 stores the received multicast data into the transmission buffer 102 (step S802). Further, if the multicast data has not been received (step S801), the process moves on to step S803.

The communication control unit 120 (the multicast transmission management unit 104) also determines whether the timing to transmit the multicast data has come (step S803). If the timing to transmit the multicast data has not come yet (step S803), the process returns to step S801. If a predetermined multicast transmission timing has come (step S803), the operation moves on to an actual transmission operation, and, at any other timing, reception of the multicast data is waited for.

If the timing to transmit the multicast data has come (step S803), the transmission data frame generation unit 105 acquires multicast transmission data from the transmission buffer 102, and generates a burst of data of predetermined multicast communication (step S804). The access control unit 108 then determines whether transmission access to the traffic (the wireless transmission path) is possible (whether access to the transmission destination device is possible) (step S805). For example, in a case where any other communication is not being performed in the traffic (the wireless transmission path), transmission access to the traffic (the wireless transmission path) can be determined to be possible (access to the transmission destination device can be determined to be possible). If transmission access to the traffic (the wireless transmission path) is not possible (step S805), monitoring is continued.

If transmission access to the traffic (the wireless transmission path) is possible (step S805), the radio signal transmission processing unit 107 transmits the multicast data (step S806).

The transmission path usage/congestion determination unit 109 then acquires the usage status of the wireless transmission path, to estimate the congestion of the traffic (the wireless transmission path) (step S807). For example, as shown in FIGS. 7 through 10, information as to whether the traffic (the wireless transmission path) is being used by its own device and other communication or the like is acquired as the usage status of the wireless transmission path.

After transmitting the multicast data, the retransmission process control unit 106 determines whether it is possible to receive an acknowledgment (ACK) of receipt of the multicast data (step S808). For example, a check can be made to determine whether it is possible to receive a receipt acknowledgment (ACK), in accordance with the congestion status of the wireless transmission traffic (the wireless transmission path, for example). An example of this determination will be described later in detail with reference to FIG. 13. If it is not possible to receive a receipt acknowledgment (ACK) (step S808), the multicast transmission process is ended. In this manner, control can be performed so that a block ACK request and a return of a block ACK are not made, and data retransmission is not performed, depending on the congestion status of the traffic (the wireless transmission path), for example.

If a receipt acknowledgment (ACK) can be received (step S808), the transmission data frame generation unit 105 constructs a block ACK request frame for the information processing device (STA) that needs to return a block ACK. The radio signal transmission processing unit 107 then wirelessly transmits the block ACK request frame (step S809).

The multicast reception management unit 114 then determines whether a block ACK has been received from the information processing device (STA) as the transmission destination of the block ACK request frame (step S810). If a block ACK has not been received (step S810), the process moves on to step S812.

If a block ACK has been received (step S810), the multicast reception management unit 114 analyzes the frame of the received block ACK, and determines whether the block ACK is addressed to its own device. Then, if the block ACK is addressed to its own device, the multicast reception management unit 114 determines whether there is undelivered data of the multicast data, in accordance with the analyzed frame of the block ACK (step S811). If there is no undelivered data of the multicast data, and there is no need to receive an acknowledgment of receipt of a block ACK request addressed to another device (step S811), the multicast transmission process is ended.

If there is undelivered data of the multicast data, or if it is necessary to receive an acknowledgment of receipt of a block ACK request addressed to another device (step S811), the multicast transmission management unit 104 selects the data to be retransmitted as necessary (step S812).

The retransmission process control unit 106 then determines whether it is necessary to transmit a block ACK request addressed to another device (step S813). If it is necessary to transmit a block ACK request addressed to another device (step S813), the process returns to step S809.

The information processing device (AP) 100 then constructs a block ACK request frame, and wirelessly transmits the block ACK request frame to another information processing device (STA) (step S809).

If transmission of a block ACK request addressed to another device is unnecessary (step S813), on the other hand, the process returns to step S804. The transmission data frame generation unit 105 then acquires multicast transmission data from the transmission buffer 102, and generates a burst of predetermined multicast communication data (step S804). The multicast communication data burst generated in this manner is then retransmitted.

Meanwhile, in a case where no further retransmission is to be performed, if an ACK is not to be received after data transmission (step S808), or if there is no undelivered data in block ACK information (step S811), the multicast transmission process is ended.

Figure 12:
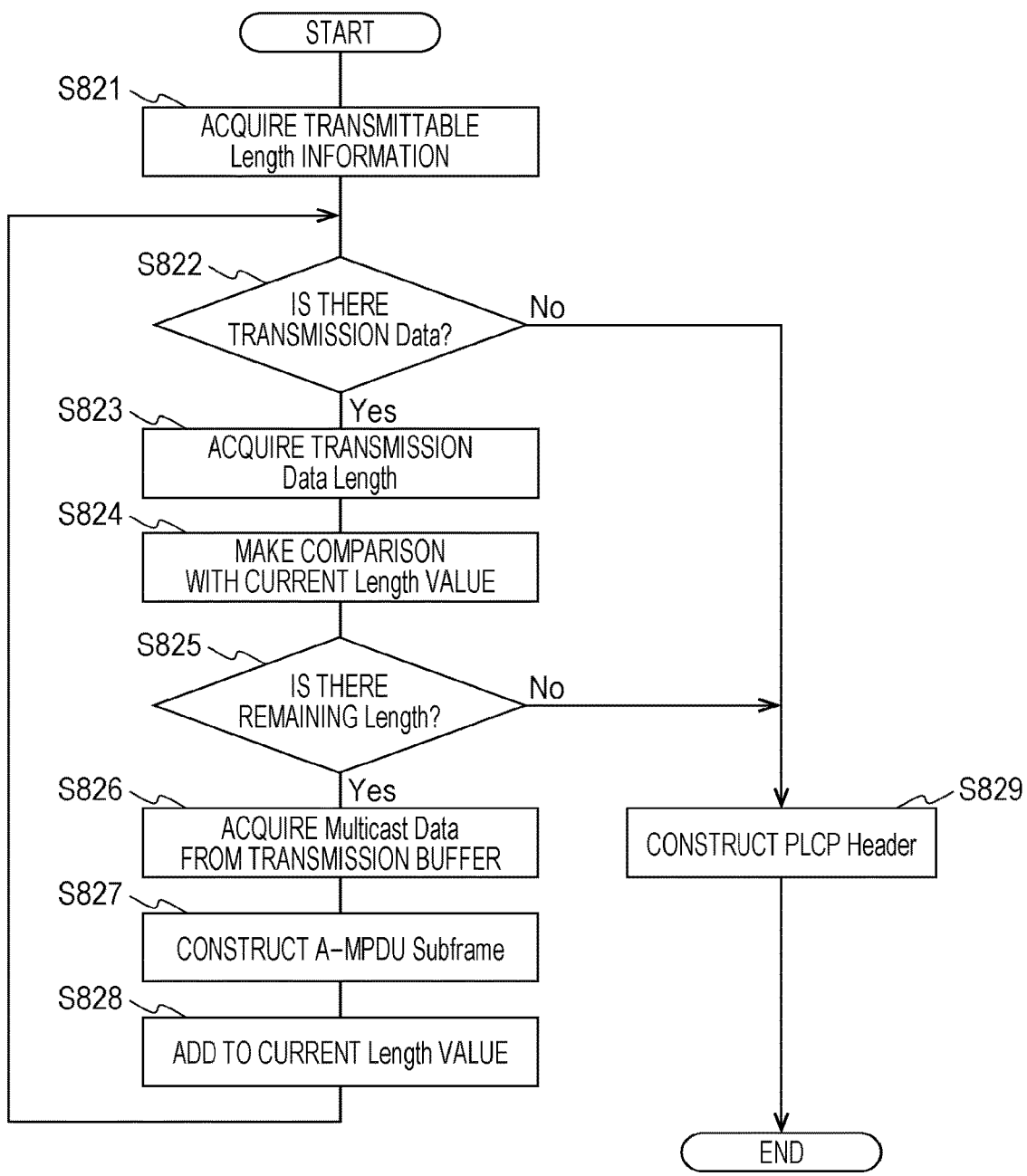
FIG. 12 is a flowchart showing an example of the processing procedures in a transmission data burst generation process in multicast communication to be performed by the information processing device (AP) 100 in the embodiment of the present technology.

Example Process of Transmission Data Burst Generation in Multicast Communication FIG. 12 is a flowchart showing an example of the processing procedures in a transmission data burst generation process in multicast communication to be performed by the information processing device (AP) 100 in the embodiment of the present technology. It should be noted that the transmission data burst generation process in multicast communication shown in FIG. 12 is the process equivalent to step S804 shown in FIG. 11, for example. FIG. 12 also shows an example case where an A-MPDU frame formed with a plurality of A-MPDU Subframes (as shown in FIG. 3) is transmitted. It should be noted that, in a case where no data to be transmitted beforehand does not exist in the transmission buffer, any transmission data burst is not generated, and therefore, the processing procedures shown in FIG. 12 may not be carried out.

First, the transmission data frame generation unit 105 acquires information about an information length (Length) that can be transmitted as a PLCP burst (step S821). The transmission data frame generation unit 105 then determines whether there is multicast data that should be transmitted (step S822).

If subframes of the A-MPDU have already been constructed, and there is no multicast data to be transmitted (step S822), the transmission data frame generation unit 105 sets one burst, constructs a PLCP header, and generates a burst (step S829).

If there is multicast data to be transmitted (step S822), the transmission data frame generation unit 105 acquires the information about the information length (Data Length) of the transmission data (step S823). The transmission data frame generation unit 105 then compares the acquired information about the information length (Data Length) of the transmission data with the set value of the current information length (Length) (step S824).

If the result of the comparison shows that the current information length (Length) is greater, and there is a remaining length (step S825), the transmission data frame generation unit 105 acquires multicast data from the transmission buffer 102 (step S826). The transmission data frame generation unit 105 then constructs a subframe of the A-MPDU (step S827). The transmission data frame generation unit 105 then performs updating by adding the value of the constructed subframe of the A-MPDU to the value of the current information length (Length) (step S828). The process then returns to step S822, and a check is made to determine whether the next data can be added (steps S822 through S825).

If there is no remaining length in the current information length (Length) (step S825), the transmission data frame generation unit 105 sets one burst, constructs a PLCP header, and generates a burst (step S829).

Example of a Retransmission Determination Process

Figure 13:
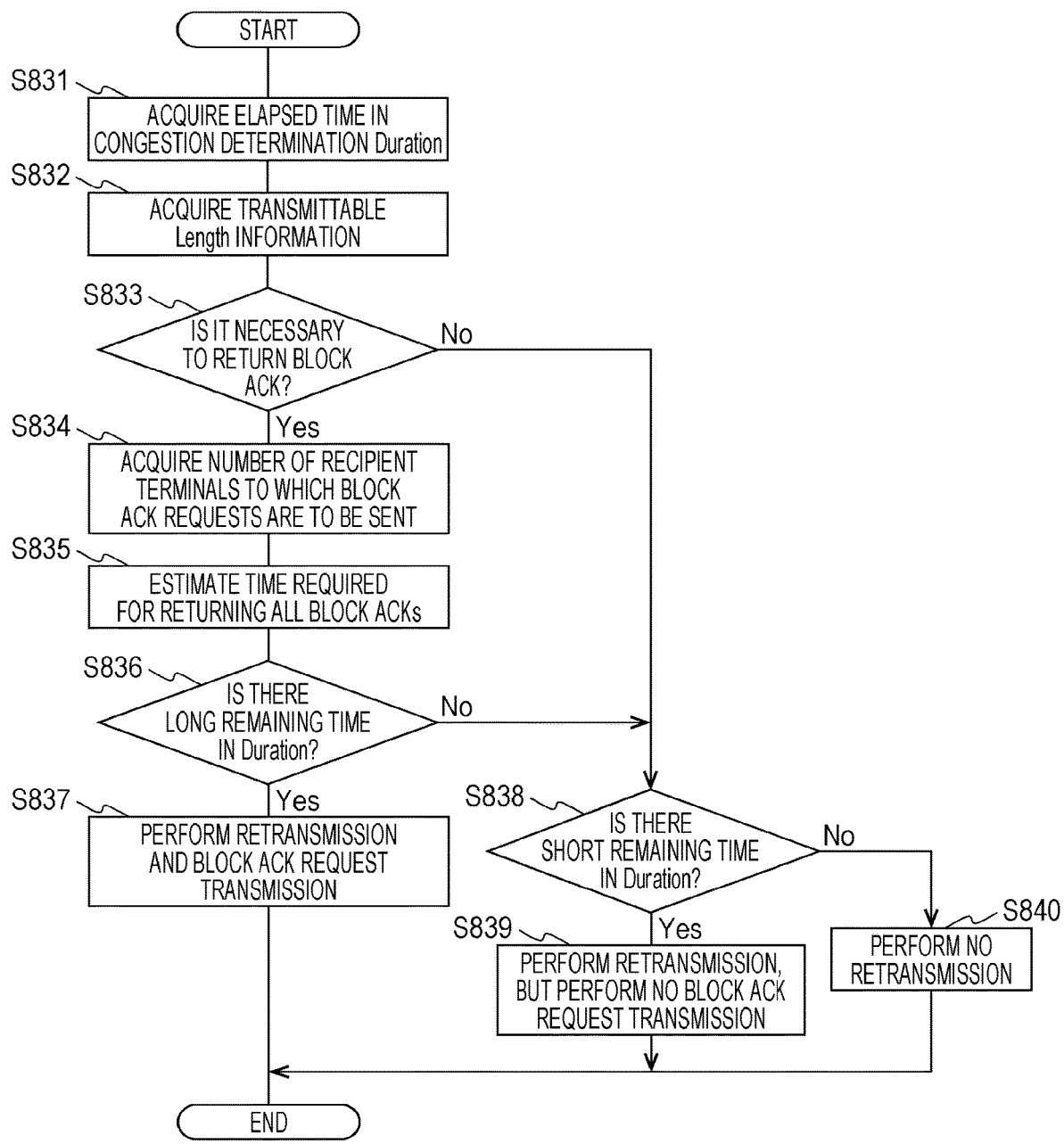
FIG. 13 is a flowchart showing an example of the processing procedures in a retransmission determination process to be performed by the information processing device (AP) 100 in the embodiment of the present technology.

FIG. 13 is a flowchart showing an example of the processing procedures in a retransmission determination process to be performed by the information processing device (AP) 100 in the embodiment of the present technology. It should be noted that the retransmission determination process shown in FIG. 13 is a process equivalent to step S808 shown in FIG. 11, for example.

First, the retransmission process control unit 106 acquires the remaining time in the Duration, to determine the degree of congestion (step S831). Here, the remaining time in the Duration is a value obtained by subtracting the value of the time between the start time of the Duration and the current time from the value of the Duration. It should be noted that the value obtained by subtracting, from the value of the Duration, the value of the time between the start time of the Duration and the current time, and the transmission time for the data to be transmitted may be regarded as the remaining time in the Duration. In a case where the information processing device (AP) 100 performs unicast transmission, the information processing device (AP) 100 may also calculate the remaining time in the Duration from the unicast transmission time.

The retransmission process control unit 106 then acquires information about the information length (Length) that can be transmitted as a PLCP burst (step S832).

The retransmission process control unit 106 then determines whether returning a block ACK after transmission is necessary (step S833). If returning a block ACK after transmission is not necessary (step S833), the process moves on to step S838.

Further, if returning a block ACK after transmission is necessary (step S833), the retransmission process control unit 106 acquires a parameter that is information about the number of information processing devices (STAs) to which a block ACK request is to be sent (step S834).

Here, the information processing devices (STA) to which a block ACK request is to be sent may be all the devices (subordinate devices) currently connected to the information processing device (AP) 100, or may be one or more devices selected from the devices currently connected to the information processing device (AP) 100. For example, in a case where the number of devices (subordinate devices) currently connected to the information processing device (AP) 100 is smaller than a threshold value, all of the devices may be selected. In a case where the number of the devices (subordinate devices) is equal to or larger than the threshold value, one or more devices may be selected.

The retransmission process control unit 106 then estimates the time required for returning all block ACKs (step S835). For example, the time required for returning all block ACKs can be obtained, in accordance with the number of the information processing devices (STAs) to which a block ACK request is to be sent, the time required for transmitting the block ACK request, and the time required for returning a block ACK.

The retransmission process control unit 106 then determines whether the remaining time in the Duration is longer than a first threshold value TH1 (step S836). It should be noted that, in a case where the remaining time is longer than a threshold value serving as the reference value, the remaining time may be not shorter than the threshold value, or may be greater than the threshold value. Likewise, in a case where the remaining time is shorter than the threshold value serving as the reference value, the remaining time may be not longer than the threshold value, or may be shorter than the threshold value. However, in a case where being longer than the threshold value serving as the reference value means being not shorter than the threshold value, being shorter than the threshold value serving as the reference value means being shorter than the threshold value. In a case where being longer than the threshold value serving as the reference value means being longer than the threshold value, on the other hand, being shorter than the threshold value serving as the reference value means being not shorter than the threshold value.

Here, the first threshold value TH1 may be a fixed value or may be a variable value. For example, the information length (Length) that can be transmitted as a PLCP burst, or another value (such as "Length+α") based on the information length (Length) may be set as the first threshold value TH1. In this case, for example, it can be determined whether retransmission is to be performed, on the basis of whether there is a Duration time longer than the information length (Length) that can be transmitted as a PLCP burst. However, the determination may be made on the basis of some other parameter.

For example, a value of about 60% of the acquired Duration value may be set as the first threshold value TH1. Alternatively, the first threshold value TH1 may be determined in accordance with the time required for returning all block ACKs, for example.

If the remaining time in the Duration is longer than the first threshold value TH1 (step S836), the retransmission process control unit 106 determines to perform retransmission and transmission of a block ACK request (step S837).

If the remaining time in the Duration is shorter than the first threshold value TH1 (step S836), the retransmission process control unit 106 determines whether the remaining time in the Duration is shorter than a second threshold value TH2 (step S838).

Here, the second threshold value TH2 is a smaller value than the first threshold value TH1 (a more relaxed value than the first threshold value TH1). Also, the second threshold value TH2 may be a fixed value or may be a variable value. For example, a value of about 20 to 40% of the acquired Duration value may be set as the second threshold value TH2.

If the remaining time in the Duration is longer than the second threshold value TH2 (step S838), the retransmission process control unit 106 determines to perform retransmission but not to request a return of a block ACK (step S839). In this manner, in a case where the remaining time in the Duration is short, retransmission is performed, but a return of a block ACK is requested.

If the remaining time in the Duration is shorter than the second threshold value TH2 (step S838), the retransmission process control unit 106 determines not to perform retransmission (step S840). In this manner, in a case where there is little time left in the Duration, retransmission is not performed. It should be noted that steps S831 through S840 are an example of the control step of the claims.

As described above, in accordance with the remaining time in the Duration, the retransmission process control unit 106 can determine whether retransmission is necessary, and determine whether transmission of a block ACK request is necessary. For example, a block ACK request and a return of a block ACK may not be made, and data retransmission may not be performed, depending on the congestion status of the wireless transmission traffic (the wireless transmission path).

As described above, in accordance with the congestion status of the wireless transmission traffic, the communication control unit 120 can perform control to restrict retransmission of data or transmission of a request for an acknowledgment of receipt of the retransmission data. For example, the communication control unit 120 can determine the congestion status of the wireless transmission traffic, in accordance with the wireless transmission traffic during a predetermined period (the Duration, for example). For example, during a predetermined time, the communication control unit 120 can determine the congestion status of the wireless transmission traffic, in accordance with the time of wireless transmission traffic usage by another device, the retransmission time of data, the transmission time of a receipt acknowledgment request, and the reception time of a receipt acknowledgment in response to the receipt acknowledgment request.

The communication control unit 120 can also perform control to restrict retransmission of multicast data, for example, in accordance with the congestion status of the wireless transmission traffic. For example, in a case where retransmission of data is performed, the communication control unit 120 can transmit a request for an acknowledgment of receipt of the retransmission data. Further, in a case where the congestion status of the wireless transmission traffic satisfies a predetermined condition (such as threshold determination), for example, the communication control unit 120 can perform control so that data retransmission is performed, but a request for an acknowledgment of receipt of the retransmission data is not transmitted, and no more retransmission is performed after the retransmission.

For example, during a predetermined period, the communication control unit 120 can determine whether to restrict retransmission of data or transmission of a request for an acknowledgment of receipt of the retransmission data, in accordance with a result of comparison between a threshold value (such as the first threshold value TH1 or the second threshold value TH2) and a value (such as the remaining time in the Duration) calculated in accordance with the time of wireless transmission traffic usage by another device, the retransmission time of the data, the transmission time of a receipt acknowledgment request, and the reception time of a receipt acknowledgment in response to the receipt acknowledgment request. Specifically, the communication control unit 120 can determine to perform retransmission of data and transmission of a request for an acknowledgment of receipt of the retransmission data, in accordance with a result of comparison between the calculated value and the first threshold value TH1, for example. Further, the communication control unit 120 can determine to perform retransmission of data but not to transmit a request for an acknowledgment of receipt of the retransmission data, or determine not to perform retransmission of data and transmission of a request for an acknowledgment of receipt of the retransmission data, in accordance with a result of comparison between the calculated value and the second threshold value TH2, for example.

Example Operation of an Information Processing Device (STA)

Figure 14:
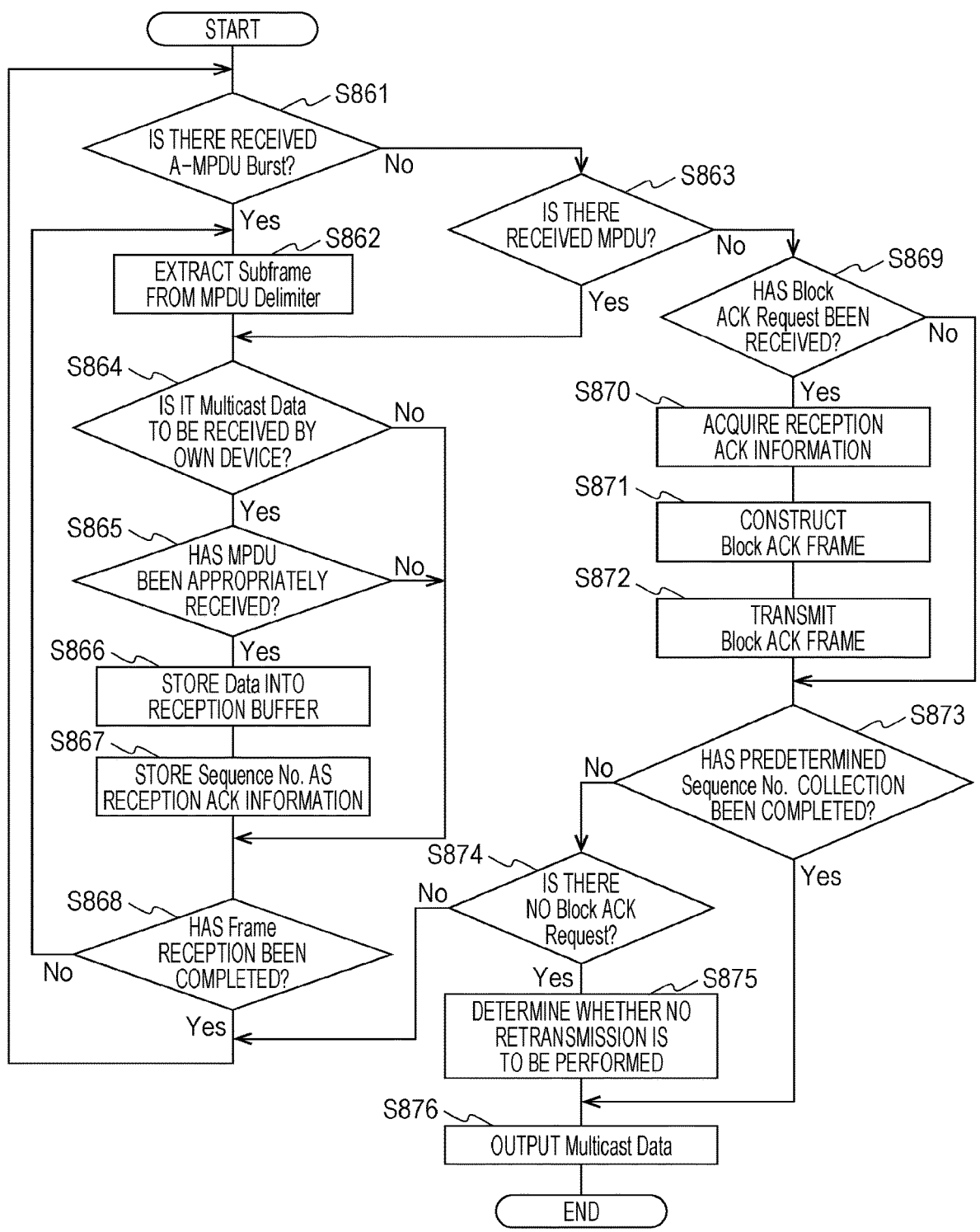
FIG. 14 is a flowchart showing an example of the processing procedures in a multicast communication reception process to be performed by the information processing device (STA) 200 in the embodiment of the present technology.

FIG. 14 is a flowchart showing an example of the processing procedures in a multicast communication reception process to be performed by the information processing device (STA) 200 in the embodiment of the present technology.

First, in a case where a wirelessly-transmitted predetermined preamble has been detected, the reception data frame extraction unit (equivalent to the reception data frame extraction unit 113 shown in FIG. 2) of the information processing device (STA) 200 decodes information according to a predetermined frame format. The reception data frame extraction unit of the information processing device (STA) 200 then determines whether an A-MPDU has been received (step S861).

If an A-MPDU has been received (step S861), the reception data frame extraction unit of the information processing device (STA) 200 extracts a subframe (hereinafter referred to as an MPDU, for ease of explanation) of the A-MPDU, in accordance with the value of the MPDU delimiter in the A-MPDU (Step S862).

If any A-MPDU has not been received (step S861), the reception data frame extraction unit of the information processing device (STA) 200 determines whether an MPDU has been received (step S863). Then, if an MPDU has been received (step S863), the reception data frame extraction unit of the information processing device (STA) 200 acquires the MPDU, and the process moves on to step S864.

The multicast reception management unit (equivalent to the multicast reception management unit 114 shown in FIG. 2) of the information processing device (STA) 200 then determines whether the MPDU is multicast data to be received by the information processing device (STA) 200 (step S864). If the MPDU is not multicast data to be received by the information processing device (STA) 200 (step S864), the process moves on to step S868.

If the MPDU is multicast data to be received by the information processing device (STA) 200 (step S864), the multicast reception management unit of the information processing device (STA) 200 determines whether the MPDU has been appropriately received (step S865). If the MPDU cannot be appropriately received (step S865), the process moves on to step S868.

If the MPDU has been appropriately received (step S865), the multicast reception management unit of the information processing device (STA) 200 stores the data into the reception buffer (equivalent to the reception buffer 116 shown in FIG. 2) (Step S866). The multicast reception management unit of the information processing device (STA) 200 then stores the sequence number of the appropriately received MPDU as reception ACK information (step S867). In a case where the MPDU is not an A-MPDU subframe, an ACK frame may be transmitted as necessary.

The multicast reception management unit of the information processing device (STA) 200 then determines whether the frame reception has been completed (step S868). For example, in a case where an A-MPDU has been received, the multicast reception management unit of the information processing device (STA) 200 determines whether reception of a series of PLCP bursts has completed (step S868). If the frame reception has not been completed (step S868), the process returns to step S862, to decode the next subframe. If the frame reception has been completed (if the reception of a series of PLCP bursts has been completed, for example) (step S868), the process returns to step S861.

Further, if any MPDU has not been received (step S863), on the other hand, the multicast reception management unit of the information processing device (STA) 200 determines whether a block ACK request has been received (step S869). If any block ACK request has not been received (step S869), the process moves on to step S873.

If a block ACK request has been received (step S869), the multicast reception management unit of the information processing device (STA) 200 acquires stored reception ACK information about multicast data (step S870). The receipt acknowledgment control unit (equivalent to the receipt acknowledgment control unit 115 shown in FIG. 2) of the information processing device (STA) 200 then performs control to construct a block ACK frame in accordance with the acquired reception ACK information (step S871). That is, the transmission data frame generation unit (equivalent to the transmission data frame generation unit 105 shown in FIG. 2) of the information processing device (STA) 200 constructs a block ACK frame under the control of the receipt acknowledgment control unit (step S871). The radio signal transmission processing unit (the radio signal transmission processing unit 107 shown in FIG. 2) of the information processing device (STA) 200 then transmits the block ACK frame (step S872).

The multicast reception management unit of the information processing device (STA) 200 then determines whether the collection up to a predetermined sequence number has been completed (step S873). Here, the predetermined sequence number may be a sequence number based on a preset fixed value (such as a ratio to the overall sequence number), for example. Alternatively, the predetermined sequence number may be a sequence number based on a variable value (such as a value that varies with the congestion status of the wireless transmission traffic), for example. The, if the collection up to the predetermined sequence number has been completed (step S873), the process moves on to step S876.

If the collection up to the predetermined sequence number has not been completed (step S873), the multicast reception management unit of the information processing device (STA) 200 determines whether the block ACK request frame has been detected at a predetermined time in the current multicast communication (step S874). Here, the predetermined time may be determined in accordance with a preset value, or may be a variable value. Alternatively, the value of the Duration may be acquired from the device on the transmission side (such as the information processing device (AP) 100), and the predetermined time may be set in accordance with the value of the Duration, for example.

If the block ACK request frame has not been detected at the predetermined time (step S874), it is determined that retransmission is to be performed, and the process returns to step S861.

If the block ACK request frame has been detected at the predetermined time (step S874), the multicast reception management unit of the information processing device (STA) 200 determines that retransmission is not to be performed (step S875). The communication control unit (equivalent to the communication control unit 120 shown in FIG. 2) of the information processing device (STA) 200 then outputs the collected multicast data to the upper layer (step S876). It should be noted that steps S873 through S876 are an example of the control step of transferring data to an upper layer in the claims.

As described above, the information processing device (STA) 200 can receive multicast data transmitted from another device (such as the information processing device (AP) 100) that restricts data retransmission in accordance with the congestion status of the wireless transmission traffic. In this case, if the data up to the predetermined sequence number in the received multicast data has been successfully acquired, the communication control unit (the communication control unit 120 shown in FIG. 2) of the information processing device (STA) 200 can perform control so that the acquired data is transferred to the upper layer.

Further, in a case where it has been determined that a request for an acknowledgment of receipt of multicast data is not to be transmitted from another device, for example, the communication control unit of the information processing device (STA) 200 can determine that retransmission of the multicast data is not to be performed thereafter. As described above, in a case where it has been determined that multicast data retransmission is not to be performed, the communication control unit of the information processing device (STA) 200 can perform control so that the data acquired before the determination is transferred to the upper layer even if the data up to the predetermined sequence number cannot be acquired.

It should be noted here that, according to a conventional multicast communication retransmission method, the number of times transmission is to be performed is determined in advance, and the number of times retransmission is to be performed cannot be controlled in accordance with receipt of an ACK. For this reason, in a case where the traffic in the wireless transmission path is congested, the time is occupied by the retransmission traffic if retransmission is repeated. This might reduce the total throughput in the network.

According to the embodiment of the present technology, on the other hand, the number of times retransmission is to be performed in multicast communication can be restricted each time, in accordance with the transmission amount (capacity) of the traffic (the wireless transmission path), the usage status of the traffic, and the congestion degree of the traffic. Thus, it is possible to prevent a decrease in the total throughput in the network, and realize an effective wireless communication technology.

For example, in a case where the traffic is occupied by other communication or the like, retransmission in multicast communication is restricted as necessary. This enables further improvement in the utilization efficiency of the entire traffic.

It is also possible to determine whether retransmission is possible in accordance with the traffic status each time, without determining beforehand the number of times retransmission is to be performed. In this manner, unnecessary retransmission can be avoided.

Further, in a case where retransmission is not performed thereafter, any block ACK request is not transmitted. As a result, the load on the traffic for a return of a block ACK can be reduced, and the transmission path can be efficiently used.

Further, in the information processing device on the transmission side, it is possible to switch operation among retransmission after a receipt acknowledgment, retransmission without a receipt acknowledgment, and no retransmission, in accordance with the usage status of the traffic. With this, retransmission control can be flexibly performed.

Further, in a case where there is no block ACK request, the information processing device on the receiving side does not need to acknowledge receipt, and thus, can output the multicast data up to the predetermined sequence to the upper layer.

As described above, according to the embodiment of the present technology, retransmission of multicast communication, transmission of a receipt acknowledgment request, and the like can be appropriately controlled in accordance with the traffic status.

Further, the information processing device (AP) 100 and the information processing devices (STAs) 200 and 210 according to the embodiment of the present technology can be applied to devices that are used in various fields. For example, these information processing devices can be applied to wireless devices (such as car navigation devices or smartphones) that are used in cars. These information processing devices can also be applied to inter-vehicle communication or road-vehicle communication (vehicle to X (V2X)), for example. Further, these information processing devices can be applied to learning devices (such as tablet terminals) that are used in educational fields, for example. These information processing devices can also be applied to wireless devices (such as terminals in a cattle management system) that are used in agricultural fields. Likewise, these information processing devices can be applied to wireless devices that are used in sports, medical fields, and the like.

2. Example Applications

The technology according to the present disclosure can be applied to various products. For example, the information processing device (AP) 100 and the information processing devices (STAs) 200 and 210 can be formed as mobile terminals such as smartphones, tablet personal computers (PCs), notebook PCs, portable game machines, or digital cameras, fixed terminals such as television receivers, printers, digital scanners, or network storages, or in-vehicle terminals such as car navigation devices. The information processing device (AP) 100 and the information processing devices (STAs) 200 and 210 may also be formed as terminals that perform machine-to-machine (M2M) communication (these terminals are also called machine type communication (MTC) terminals), such as smart meters, vending machines, remote monitoring devices, or Point Of Sale (POS) terminals. Further, the information processing device (AP) 100 and the information processing devices (STAs) 200 and 210 may be wireless communication modules installed in those terminals (such as integrated circuit modules each formed with a single die).

Meanwhile, the information processing device (AP) 100 may be formed as a wireless LAN access point (also called a wireless base station) having a router function or not having a router function, for example. The information processing device (AP) 100 may also be formed as a mobile wireless LAN router. Further, the information processing device (AP) 100 may be a wireless communication module installed in these devices (such as an integrated circuit module formed with a single die).

[2-1. First Application]

Figure 15:
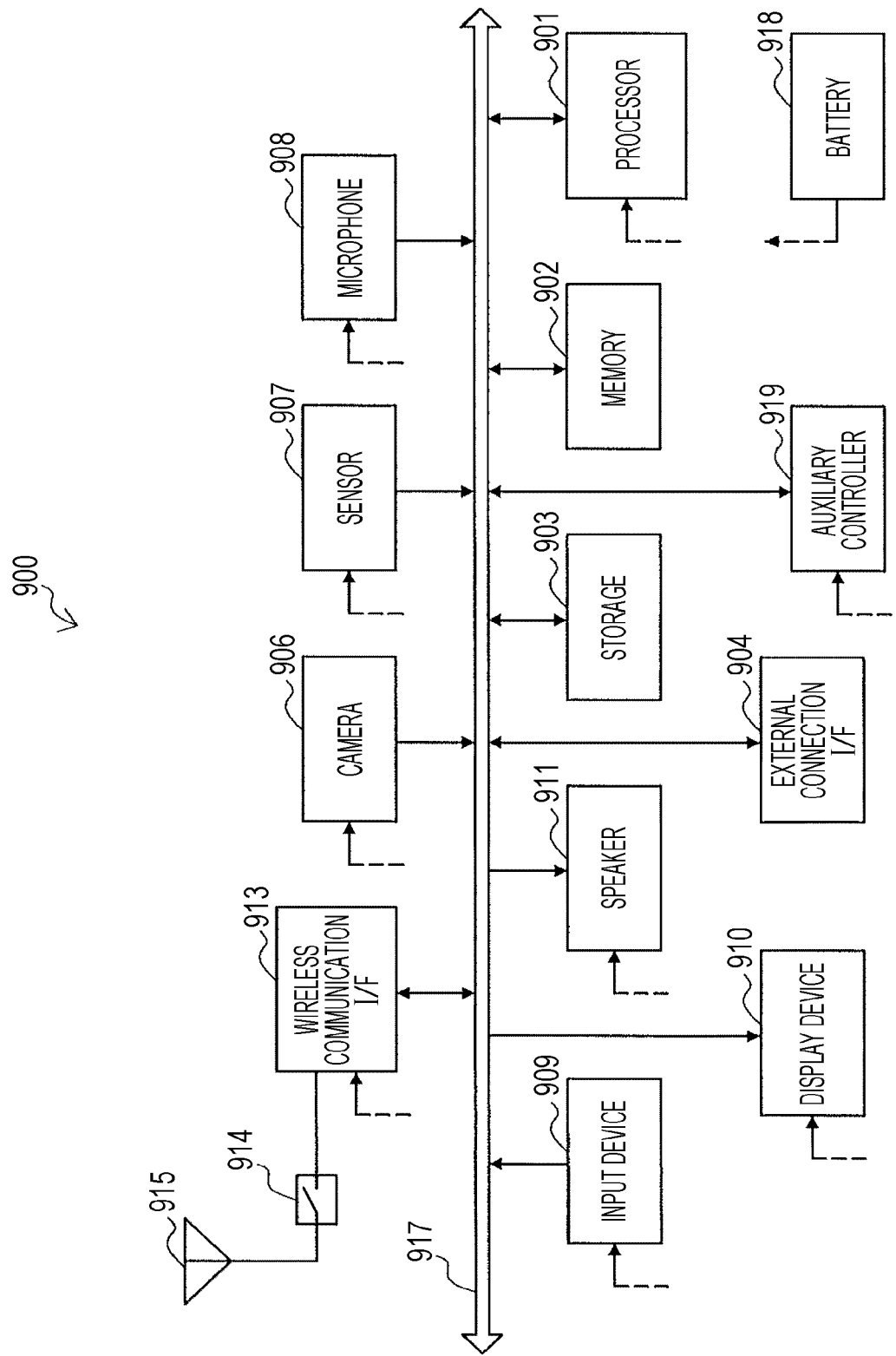
FIG. 15 is a block diagram schematically showing an example configuration of a smartphone.

FIG. 15 is a block diagram schematically showing an example configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be a central processing unit (CPU) or a system-on-chip (SoC), for example, and controls the functions of the application layer and the other layers of the smartphone 900. The memory 902 includes a random access memory (RAM) and a read only memory (ROM), and stores the program to be executed by the processor 901, and data. The storage 903 can include a storage medium such as a semiconductor memory or a hard disk. The external connection interface 904 is the interface for connecting an external device such as a memory card or a universal serial bus (USB) device to the smartphone 900.

The camera 906 includes an imaging device such as a charge coupled device (CCD) or a complementary metal oxide semiconductor (CMOS), and generates captured images. The sensor 907 may include a group of sensors, such as a location sensor, a gyro sensor, a geomagnetic sensor, and an acceleration sensor. The microphone 908 converts sound input to the smartphone 900 into a sound signal. The input device 909 includes a touch sensor that detects touching of the screen of the display device 910, a keypad, a keyboard, and buttons or switches, for example, and accepts an operation or information input from a user. The display device 910 has a screen such as a liquid crystal display (LCD) or an organic light emitting diode (OLED) display, and displays an image output from the smartphone 900. The speaker 911 converts a sound signal output from the smartphone 900 into sound.

The wireless communication interface 913 supports one or more of wireless LAN standards such as IEEE802.11a, 11b, 11g, 11n, 11ac, and 11ad, and conducts wireless communication. In infrastructure mode, the wireless communication interface 913 can communicate with another device via a wireless LAN access point. Further, in ad-hoc mode or in direct communication mode such as Wi-Fi Direct, the wireless communication interface 913 can communicate directly with another device. It should be noted that, in Wi-Fi Direct, one of the two terminals functions as an access point, which differs from the ad-hoc mode, but communication is performed directly between those terminals. The wireless communication interface 913 typically includes a baseband processor, a radio frequency (RF) circuit, a power amplifier, and the like. The wireless communication interface 913 may be a single-chip module formed by integrating a memory that stores a communication control program, a processor that executes the program, and other related circuits. The wireless communication interface 913 may support other kinds of wireless communication methods such as the near field communication method, the proximity wireless communication method, and the cellular communication method, as well as the wireless LAN method. The antenna switch 914 switches the connection destination of the antenna 915 between a plurality of circuits included in the wireless communication interface 913 (such as circuits for different wireless communication methods). The antenna 915 includes one or more antenna elements (such as the plurality of antenna elements constituting a MIMO antenna), and is used for transmitting and receiving radio signals through the wireless communication interface 913.

It should be noted that the smartphone 900 is not limited to the example shown in FIG. 15, and may include more than one antenna (such as an antenna for wireless LAN and an antenna for the proximity wireless communication method). In such a case, the antenna switch 914 may be excluded from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to one another. The battery 918 supplies power to the respective blocks of the smartphone 900 shown in FIG. 15, via feed lines partially indicated by dashed lines in the drawing. The auxiliary controller 919 activates the minimum necessary functions of the smartphone 900 in sleep mode, for example.

In the smartphone 900 shown in FIG. 15, the communication control unit 120 described above with reference to FIG. 2 may be implemented in the wireless communication interface 913. Alternatively, at least part of those functions may be implemented in the processor 901 or the auxiliary controller 919. For example, as retransmission of data or transmission of a request for an acknowledgment of receipt of the retransmission data is restricted in accordance with the congestion status of the wireless transmission traffic, power consumption by the battery 918 can be reduced.

It should be noted that the smartphone 900 may also function as a wireless access point (software AP), as the processor 901 executes an access point function at the application level. Alternatively, the wireless communication interface 913 may have a wireless access point function.

[2-2. Second Application]

Figure 16:
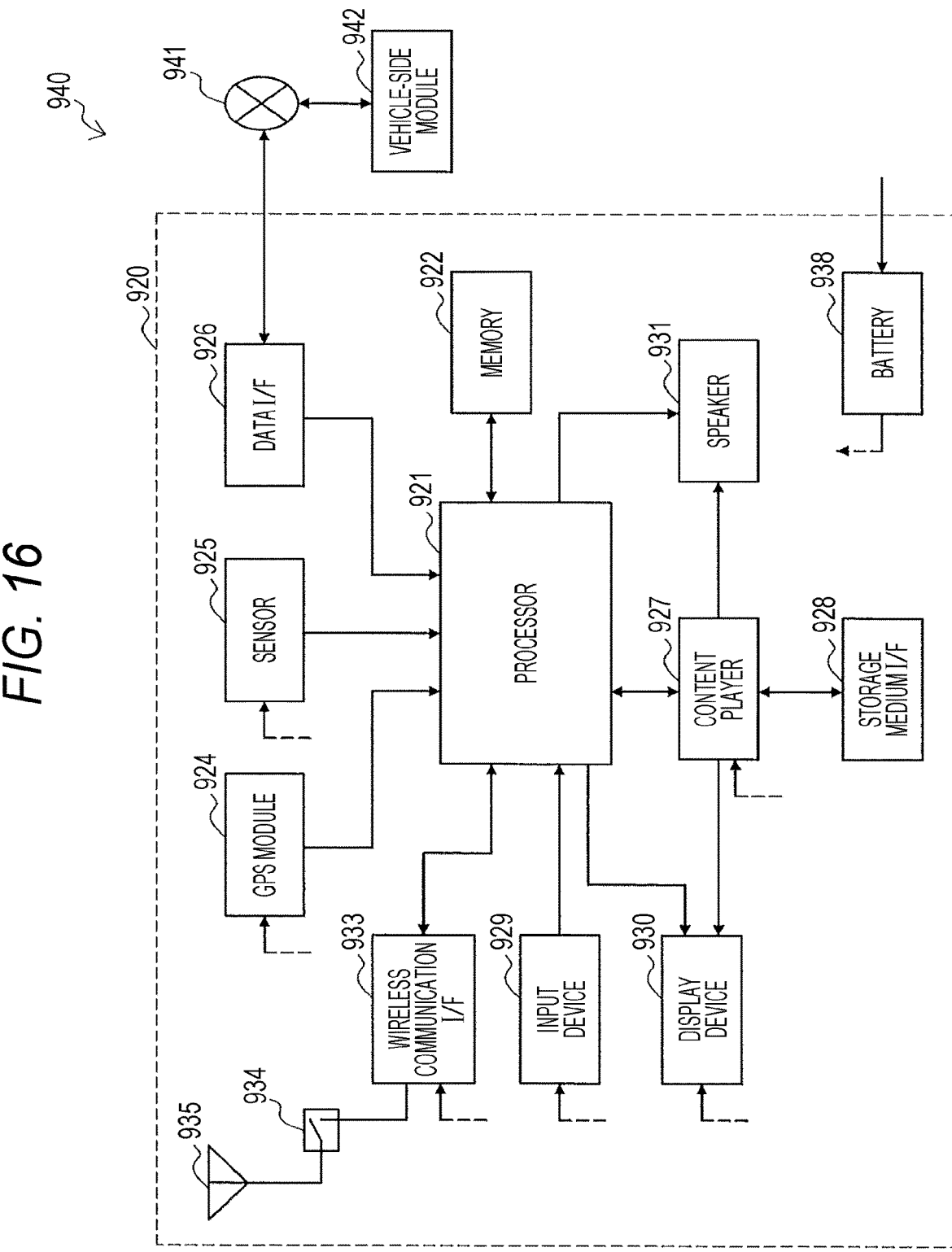
FIG. 16 is a block diagram schematically showing an example configuration of a car navigation device.

FIG. 16 is a block diagram schematically showing an example configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be a CPU or a SoC, for example, and controls the navigation function and the other functions of the car navigation device 920. The memory 922 includes a RAM and a ROM, and stores the program to be executed by the processor 921, and data.

The GPS module 924 measures the location (such as the latitude, the longitude, and the altitude) of the car navigation device 920, using a GPS signal received from a GPS satellite. The sensor 925 may include a group of sensors, such as a gyro sensor, a geomagnetic sensor, and an atmospheric pressure sensor. The data interface 926 is connected to an in-vehicle network 941 via a terminal (not shown), for example, and acquires data generated on the vehicle side, such as vehicle speed data.

The content player 927 reproduces content stored in a storage medium (such as a CD or a DVD) inserted into the storage medium interface 928. The input device 929 includes a touch sensor that detects touching of the screen of the display device 930, and buttons or switches, for example, and accepts an operation or information input from a user. The display device 930 has a screen such as an LCD or an OLED display, and displays the image of a navigation function or content being reproduced. The speaker 931 outputs the sound of a navigation function or content being reproduced.

The wireless communication interface 933 supports one or more of wireless LAN standards such as IEEE802.11a, 11b, 11g, 11n, 11ac, and 11ad, and conducts wireless communication. In infrastructure mode, the wireless communication interface 933 can communicate with another device via a wireless LAN access point. Further, in ad-hoc mode or in direct communication mode such as Wi-Fi Direct, the wireless communication interface 933 can communicate directly with another device. The wireless communication interface 933 typically includes a baseband processor, an RF circuit, a power amplifier, and the like. The wireless communication interface 933 may be a single-chip module formed by integrating a memory that stores a communication control program, a processor that executes the program, and other related circuits. The wireless communication interface 933 may support other kinds of wireless communication methods such as the near field communication method, the proximity wireless communication method, and the cellular communication method, as well as the wireless LAN method. The antenna switch 934 switches the connection destination of the antenna 935 between a plurality of circuits included in the wireless communication interface 933. The antenna 935 includes one or more antenna elements, and is used for transmitting and receiving radio signals through the wireless communication interface 933.

It should be noted that the car navigation device 920 is not limited to the example shown in FIG. 16, and may include more than one antenna. In such a case, the antenna switch 934 may be excluded from the configuration of the car navigation device 920.

The battery 938 supplies power to the respective blocks of the car navigation device 920 shown in FIG. 16, via feed lines partially indicated by dashed lines in the drawing. The battery 938 also stores power supplied from the vehicle side.

In the car navigation device 920 shown in FIG. 16, the communication control unit 120 described above with reference to FIG. 2 may be implemented in the wireless communication interface 933. Alternatively, at least part of those functions may be implemented in the processor 921. For example, as retransmission of data or transmission of a request for an acknowledgment of receipt of the retransmission data is restricted in accordance with the congestion status of the wireless transmission traffic, power consumption by the battery 938 can be reduced.

Further, the wireless communication interface 933 may operate as the above described information processing device (AP) 100, and may provide a wireless connection to a terminal owned by a user in the vehicle.

Also, the technology according to the present disclosure may be embodied as an in-vehicle system (or a vehicle) 940 that includes one or more of the blocks of the above described car navigation device 920, the in-vehicle network 941, and a vehicle-side module 942. The vehicle-side module 942 generates vehicle-side data such as the number of revolutions of the engine or failure information, and outputs the generated data to the in-vehicle network 941.

[2-3. Third Application]

Figure 17:
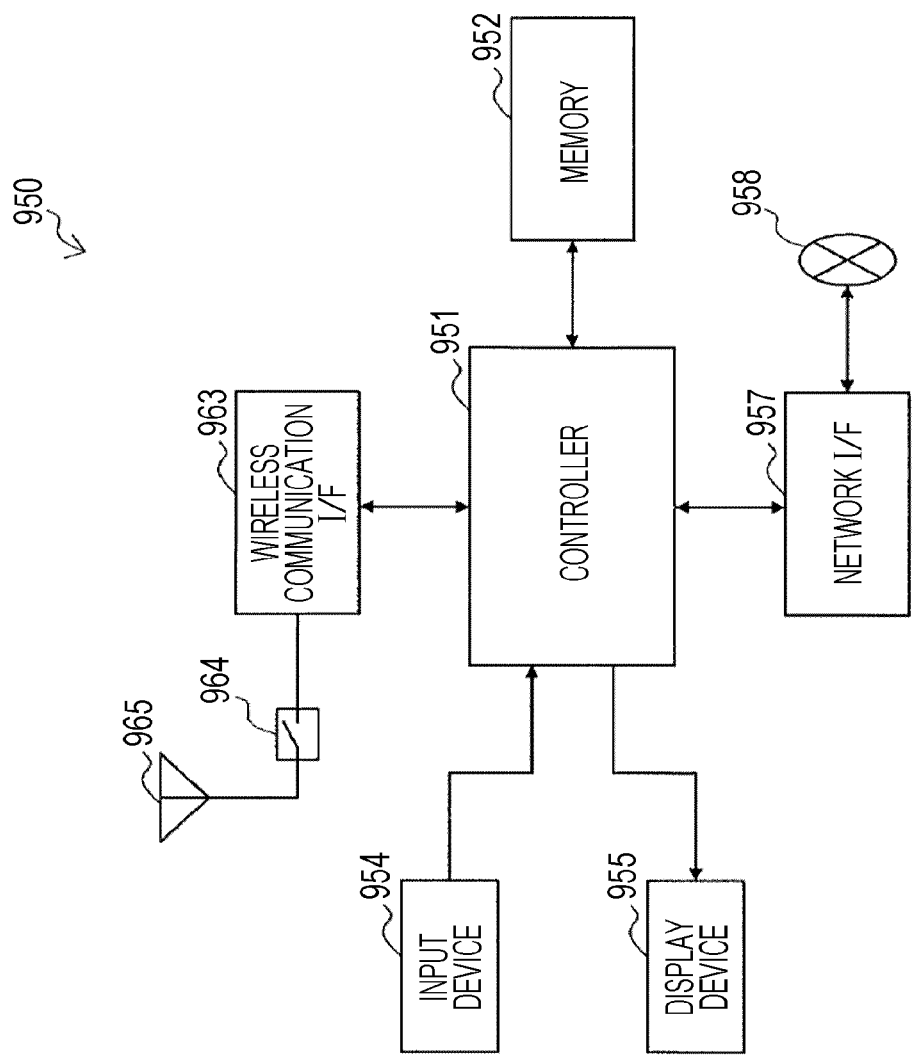
FIG. 17 is a block diagram schematically showing an example configuration of a wireless access point.

FIG. 17 is a block diagram schematically showing an example configuration of a wireless access point 950 to which the technology according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be a CPU or a digital signal processor (DSP), for example, and activates various functions (such as access restriction, routing, encryption, firewall, and log management) of the Internet Protocol (IP) layer and the higher layers of the wireless access point 950. The memory 952 includes a RAM and a ROM, and stores the programs to be executed by the controller 951 and various kinds of control data (such as a terminal list, a routing table, an encryption key, a security setting, and a log).

The input device 954 includes buttons or switches, for example, and accepts an operation from the user. The display device 955 includes an LED lamp and the like, and displays the operation status of the wireless access point 950.

The network interface 957 is a wired communication interface for the wireless access point 950 to connect to the wired communication network 958. The network interface 957 may have a plurality of connection terminals. The wired communication network 958 may be a LAN such as Ethernet (registered trademark), or may be a wide area network (WAN).

The wireless communication interface 963 supports one or more of wireless LAN standards such as IEEE802.11a, 11b, 11g, 11n, 11ac, and 11ad, and provides a wireless connection as an access point to a terminal in its vicinity. The wireless communication interface 963 typically includes a baseband processor, an RF circuit, a power amplifier, and the like. The wireless communication interface 963 may be a single-chip module formed by integrating a memory that stores a communication control program, a processor that executes the program, and other related circuits. The antenna switch 964 switches the connection destination of the antenna 965 between a plurality of circuits included in the wireless communication interface 963. The antenna 965 includes one or more antenna elements, and is used for transmitting and receiving radio signals through the wireless communication interface 963.

In the wireless access point 950 shown in FIG. 17, the communication control unit 120 described above with reference to FIG. 2 may be implemented in the wireless communication interface 963. Alternatively, at least part of those functions may be implemented in the controller 951.

It should be noted that the above described embodiment is an example for embodying the present technology, and the matter of the embodiment corresponds to the subject matter of the claims. Likewise, the subject matter of the claims corresponds to the matter under the same names as the subject matter of the claims in the embodiments of the present technology. However, the present technology is not limited to the embodiments, and various changes can be made to the embodiments without departing from the scope of the technology.

Also, the processing procedures described above in the embodiments may be regarded as a method involving the series of these procedures, or may be regarded as a program for causing a computer to carry out the series of these procedures or as a recording medium storing the program. This recording medium may be a compact disc (CD), a minidisc (MD), a digital versatile disc (DVD), a memory card, or a Blu-ray (registered trademark) disc, for example.

It should be noted that the advantageous effects described in this specification are merely examples, and the advantageous effects of the present technology may include other effects.

It should be noted that the present technology may also be embodied in the configurations described below.

(1)

An information processing device including a control unit that performs control to restrict retransmission of data or transmission of a request for an acknowledgment of receipt of the retransmission data, in accordance with the congestion status of a wireless transmission traffic.

(2)

The information processing device of (1), in which the control unit performs control to restrict retransmission of multicast data in accordance with the congestion status.

(3)

The information processing device of (1) or (2), in which, in a case where retransmission of the data is performed, the control unit transmits a request for an acknowledgment of receipt of the retransmission data.

(4)

The information processing device of (1) or (2), in which, in a case where the congestion status satisfies a predetermined condition, the control unit performs retransmission of the data, but does not transmit a request for an acknowledgment of receipt of the retransmission data and does not perform further retransmission after the retransmission.

(5)

The information processing device of any of (1) to (4), in which the control unit determines the congestion status in accordance with the wireless transmission traffic during a predetermined period.

(6)

The information processing device of any of (1) to (5), in which the control unit determines the congestion status, in accordance with the times of usage of the wireless transmission traffic by the information processing device and another device, the retransmission time of the data, the transmission time of the receipt acknowledgment request, and the reception time of a receipt acknowledgment in response to the receipt acknowledgment request, during a predetermined period.

(7)

The information processing device of any of (1) to (6), in which the control unit determines whether to restrict retransmission of the data or transmission of a request for an acknowledgment of receipt of the retransmission data, in accordance with a result of comparison between a threshold value and a value calculated in accordance with the times of usage of the wireless transmission traffic by the information processing device and another device, the retransmission time of the data, the transmission time of the receipt acknowledgment request, and the reception time of a receipt acknowledgment in response to the receipt acknowledgment request, during a predetermined period.

(8)

The information processing device of (7), in which the control unit determines to perform retransmission of the data and transmission of a request for an acknowledgment of receipt of the retransmission data in accordance with a result of comparison between the calculated value and a first threshold value, and determines to perform retransmission of the data and not to transmit a request for an acknowledgment of receipt of the retransmission data, or not to perform retransmission of the data and transmission of a request for an acknowledgment of receipt of the retransmission data, in accordance with a result of comparison between the calculated value and a second threshold value, the second threshold value being a more relaxed value than the first threshold value.

(9)

An information processing device including a control unit that performs control to transfer acquired data to an upper layer in case of having successfully acquired the data up to a predetermined sequence number in multicast data transmitted from another device that restricts retransmission of data in accordance with the congestion status of a wireless transmission traffic.

(10)

The information processing device of (9), in which the control unit determines that retransmission of the multicast data is not to be performed in case of detecting that a request for an acknowledgment of receipt of the multicast data is not to be transmitted from the another device.

(11)

The information processing device of (10), in which, in case of determining that retransmission of the multicast data is not to be performed, the control unit performs control to transfer data acquired before the determination to the upper layer even in case of having failed to acquire the data up to the predetermined sequence number.

(12)

A communication system including:

a first information processing device that transmits a receipt acknowledgment in response to a request for an acknowledgment of receipt of data, in case of having received the request; and a second information processing device that restricts retransmission of the data or transmission of a request for an acknowledgment of receipt of the retransmission data, in accordance with the congestion status of a wireless transmission traffic.

(13)

An information processing method including a control step of performing control to restrict retransmission of data or transmission of a request for an acknowledgment of receipt of the retransmission data, in accordance with the congestion status of a wireless transmission traffic.

(14)

An information processing method including a control step of performing control to transfer acquired data to an upper layer in case of having successfully acquired the data up to a predetermined sequence number in multicast data transmitted from another device that restricts retransmission of data in accordance with the congestion status of a wireless transmission traffic.

(15)

A program for causing a computer to carry out a control step of performing control to restrict retransmission of data or transmission of a request for an acknowledgment of receipt of the retransmission data, in accordance with the congestion status of a wireless transmission traffic.

(16)

A program for causing a computer to carry out a control step of performing control to transfer acquired data to an upper layer in case of having successfully acquired the data up to a predetermined sequence number in multicast data transmitted from another device that restricts retransmission of data in accordance with the congestion status of a wireless transmission traffic.

REFERENCE SIGNS LIST

10 Communication system
21 Internet connection unit
22 Information input unit
23 Device control unit
24 Information output unit
100 Information processing device (AP)
101 Interface unit
102 Transmission buffer
103 Buffer management unit
104 Multicast transmission management unit
105 Transmission data frame generation unit
106 Retransmission process control unit
107 Radio signal transmission processing unit
108 Access control unit
109 Transmission path usage/congestion determination unit
110 Antenna control unit
111A, 111B Antenna element
112 Radio signal reception processing unit
113 Reception data frame extraction unit
114 Multicast reception management unit
115 Receipt acknowledgment control unit 116 Reception buffer
120 Communication control unit
200, 210 Information processing device (STA)
220 Information processing device (OBS)
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation device
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle-side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing device comprising:
circuitry configured to:
set a duration for retransmitting of data, the duration for determining a congestion degree of a traffic, and the duration set based on at least one of a size of the data, an application type, and user configuration;
acquire remaining time in the duration for retransmitting of the data and a number of second information processing devices to send acknowledgement requests from the information processing device, the second information processing devices having not received the data from the information processing device; and
determine a transmission option from one of a first option, a second option, and a third option based on the remaining time in the duration, the first option being retransmission of the data and transmission of the acknowledgement requests in association with the retransmitted data to the second information processing devices,
the second option being retransmission of the data to the second information processing devices without transmitting the acknowledgement requests to the second information processing devices, and
the third option being no transmission of the data or the acknowledgement requests to the second information processing devices.

2. The information processing device according to claim 1, wherein the data is multicast data to the second information processing devices.

3. The information processing device according to claim 1, wherein the circuitry is configured to perform the first option, when the remaining duration exceeds a first threshold value.

4. The information processing device according to claim 3, wherein the circuitry is configured to perform the second option, when the remaining time in the duration is less than the first threshold value but exceeds a second threshold value.

5. The information processing device according to claim 4, wherein the circuitry determines whether to restrict retransmission of the data or transmission of the acknowledgment requests, in accordance with a result of comparison between the first and the second threshold values and a value calculated in accordance with times of usage of a wireless transmission traffic by the information processing device and the second information processing devices, a retransmission time of the data, a transmission time of the acknowledgment requests, and a reception time of a receipt of acknowledgment from respective second information processing device in response to the acknowledgment request to the respective second information processing device, during a predetermined period.

6. The information processing device according to claim 5, wherein the circuitry is configured to perform the third option, when the remaining time in the duration is less than the second threshold value.

7. The information processing device according to claim 1, wherein the circuitry determines the congestion degree in accordance with wireless transmission traffic during a predetermined period.

8. The information processing device according to claim 7, wherein the circuitry determines the congestion degree, in accordance with times of usage of the wireless transmission traffic by the information processing device and the second information processing devices, a retransmission time of the data, a transmission time of the acknowledgment requests, and a reception time of a receipt of acknowledgment from respective second information processing device in response to the acknowledgment request to the respective second information processing device, during a predetermined period.

9. An information processing device comprising:
circuitry configured to:
transfer acquired data to an upper layer in a case of having successfully acquired the data up to a predetermined sequence number in multicast data transmitted from another information processing device, the other information processing device transmitting the multicast data and acquiring remaining time in a duration for retransmitting of data and a number of second information processing devices to send acknowledgement requests from the other information processing device, the second information processing devices having not received the data from the other information processing device, the duration for retransmitting of data being set as a determining a congestion degree of a traffic, and the duration set based on at least one of a size of the data, an application type, and user configuration, wherein a transmission option is determined by the other information processing device, from one of a first option, a second option, and a third option based on the remaining time in the duration, the first option being retransmission of the data and transmission of the acknowledgement requests in association with the retransmitted data to the second information processing devices, the second option being retransmission of the data to the second information processing devices without transmitting the acknowledgement requests to the second information processing devices, and the third option being no transmission of the data or the acknowledgement requests to the second information processing devices.

10. The information processing device according to claim 9, wherein the circuitry determines that retransmission of the multicast data is not to be performed in case of detecting that the acknowledgment request in association with receipt of the multicast data is not to be transmitted from the other information processing device.

11. The information processing device according to claim 10, wherein, in case of determining that retransmission of the multicast data is not to be performed, the circuitry transfers data acquired before the determination to the upper layer even in case of having failed to acquire the data up to the predetermined sequence number.

12. A communication system comprising:
a first information processing device; and
a plurality of second information processing devices, wherein the first information processing device includes a first circuitry configured to
set a duration for retransmitting of data, the duration for determining a congestion degree of a traffic, and the duration set based on at least one of a size of the data, an application type, and user configuration, and
acquire remaining time in the duration for retransmitting of data and a number of the second information processing devices to send acknowledgement requests from the first information processing device, the plurality of second information processing devices having not received the data from the first information processing device,
wherein the first circuitry of the first information processing device determines a transmission option from one of a first option, a second option, and a third option based on the remaining time in the duration,
the first option being retransmission of the data and transmission of the acknowledgement requests in association with the retransmitted data to the second information processing devices,
the second option being retransmission of the data to the second information processing devices without transmitting the acknowledgement requests to the second information processing devices, and
the third option being no transmission of the data or the acknowledgement requests to the second information processing devices, and
wherein each second information processing device of the plurality of second information processing devices includes a second circuitry configured to transfer acquired data to an upper layer in a case of having successfully acquired the data up to a predetermined sequence number in multicast data transmitted from the first information processing device.

* * * * *